United States Patent [19]

Funk

[11] 4,282,006

[45] Aug. 4, 1981

[54] COAL-WATER SLURRY AND METHOD FOR ITS PREPARATION

[75] Inventor: James E. Funk, Alfred Station, N.Y.

[73] Assignee: Alfred University Research Foundation Inc., Alfred, N.Y.

[21] Appl. No.: 88,815

[22] Filed: Oct. 26, 1979

Related U.S. Application Data

[63] Continuation-in-part of Ser. No. 957,166, Nov. 2, 1978, abandoned, which is a continuation-in-part of Ser. No. 790,337, Apr. 25, 1977, abandoned.

[51] Int. Cl.³ ............................................... C10L 1/32
[52] U.S. Cl. ......................................... 44/51; 406/197
[58] Field of Search ...................... 44/51.1 R; 302/66; 406/197

[56] References Cited

U.S. PATENT DOCUMENTS

| | | |
|---|---|---|
| 2,208,514 | 7/1940 | Jannek et al. . |
| 2,231,513 | 2/1941 | Stillman ................................... 44/51 |
| 2,359,325 | 10/1944 | McConnell et al. . |
| 2,590,733 | 3/1952 | Stillman ................................... 44/51 |
| 2,610,900 | 9/1952 | Cross, Jr. . |
| 2,702,240 | 2/1955 | Rees et al. . |
| 2,791,471 | 5/1957 | Clancey et al. . |
| 2,791,472 | 5/1957 | Barthauer et al. . |
| 2,920,923 | 1/1960 | Wasp et al. . |
| 3,019,059 | 1/1962 | McMurtrie . |
| 3,073,652 | 1/1963 | Reichl .................................. 406/197 |
| 3,147,212 | 9/1964 | Van Koppen et al. . |
| 3,168,350 | 2/1965 | Rhinney et al. ..................... 406/197 |
| 3,423,313 | 1/1969 | Messer . |
| 3,615,779 | 10/1971 | Freyhold ............................. 252/352 |
| 3,617,095 | 11/1971 | Lissant . |
| 3,620,698 | 11/1971 | Schlinger et al. . |
| 3,682,114 | 8/1972 | Scheubel . |
| 3,762,887 | 10/1973 | Clancey et al. . |
| 3,764,547 | 10/1973 | Schlinger et al. ....................... 44/51 |
| 3,909,212 | 9/1975 | Schroeder . |
| 3,941,552 | 3/1976 | Cottell . |
| 3,950,147 | 4/1976 | Funk et al. . |
| 3,960,513 | 6/1976 | Azarwal et al. . |
| 3,976,582 | 8/1976 | Douglas et al. ...................... 252/309 |
| 3,993,455 | 11/1976 | Reggel et al. . |
| 3,996,026 | 12/1976 | Cole . |
| 4,104,035 | 8/1978 | Cole et al. ............................... 44/51 |
| 4,187,078 | 2/1980 | Shimizu et al. ......................... 44/51 |

FOREIGN PATENT DOCUMENTS

| | | |
|---|---|---|
| 2727943 | 5/1978 | Fed. Rep. of Germany . |
| 711105 | 6/1954 | United Kingdom . |

OTHER PUBLICATIONS

Snell and Ettre's "Encyclopedia of Industrial Chemical Analysis", vol. 10, pp. 100–137 and 209–262.
Kirk–Othmer, "Encyclopedia of Chemistry", pp. 606–678.
German Publication Brennstoff Waerme Kraft, O. Schwartz and H. Mertin, 18 (10) pp. 474–478 (1966).

Primary Examiner—Patrick Garvin
Assistant Examiner—J. V. Howard
Attorney, Agent, or Firm—Schovee & Boston

[57] ABSTRACT

A pipeline pumpable coal-water slurry having a novel combination of coal particles and carrier water is prepared by a method wherein the particle sizes and their distribution are controlled in accordance with a particle size distribution formula which is especially beneficial for providing a novel coal compact with a minimum amount of void space between particles and a maximum amount of particle surface area with an advantageous amount of colloidal sized particles present. These features combine to enhance the dispersing effects generated by electrolytes and/or dispersing agents selected and added to the coal compact and/or slurry to provide a near maximum zeta potential to the particles in the slurry and to provide low viscosity to the resulting yield pseudoplastic coal-water slurry. Brookfield viscosities obtained, e.g. 1000 cps, or less, at 60 rpm with 75 wt. % coal, dry basis, make the coal-water slurry especially advantageous for transport by pipeline over long distances. The coal-water slurry can be provided at a high coal content so that the slurry can be burned directly without need for dewatering at its destination.

40 Claims, 13 Drawing Figures

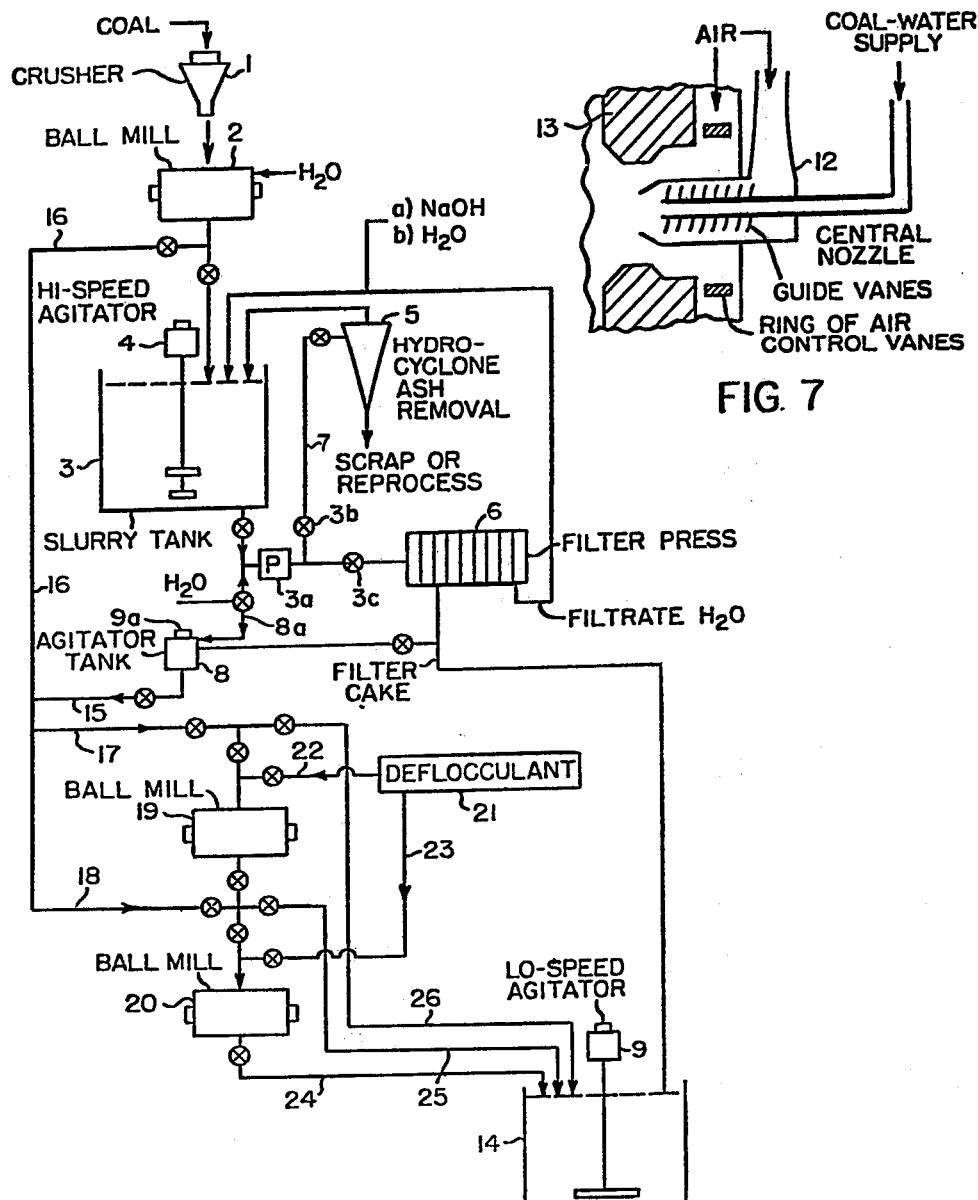
FIG. 7
FIG. 6
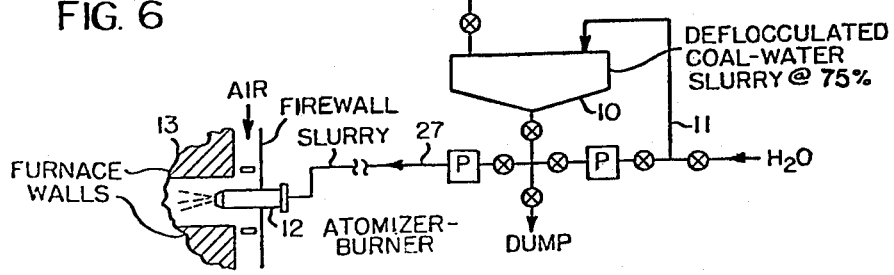

COAL-WATER SLURRY AND METHOD FOR ITS PREPARATION

CROSS-REFERENCES TO RELATED APPLICATIONS

This application is a continuation-in-part of copending application Ser. No. 957,166 filed on Nov. 2, 1978, now abandoned, which was a continuation-in-part of copending application Ser. No. 790,337 filed on Apr. 25, 1977 and also now abandoned.

TECHNICAL FIELD

This invention relates to an improved pipeline pumpable high solids content coal-water slurry having a Brookfield viscosity of about 2000 cps or less at 60 rpm at about 75 wgt. %, dry basis, coal content. The slurry is utilized primarily for generation of heat energy in a furnace provided with slurry conveying means and equipped with either a cyclone or a turbulent type of burner.

Further, this invention relates to a method for making such an improved, high solids content coal-water slurry which is suitable for long distance pumpline conveyance to coal-water slurry combustion, gasification or other coal utilization processes, and, which is especially suitable for direct burning in a furnace into which the coal-water slurry is charged by means of a cyclone or a turbulent burner without further treatment, such as dewatering of the slurry.

More particularly, this invention relates to an improved high solids content coal-water slurry having yield pseudoplastic rheological properties suitable for pipeline transport and to a method for its preparation. The coal preferably is partially de-ashed.

Further, this invention relates to a slurry comprising finely divided particles of at least one solid material wherein the particles in the slurry have a particle size range and particle size distribution, and physical, and electrochemical attributes advantageous for transporting the slurry in a pipeline in the presence of a carrier fluid.

BACKGROUND OF THE PRIOR ART

Processes for preparing and utilizing partially de-ashed solid-fuel-water slurries and conveying the slurry by various conveying means, such as pumps, are known. O. Schwartz and H. Merten, *Brennstoff Waerme Kraft* 18 (10), 474–8 (1966) (Ger) describe a pilot plant in which coal was pulverized dry or wet in ball mills and disk grinders to provide particles up to 77% finer than 0.06 mm (60 μm).

Other processes are described in U.K. Patent No. 711,105; French Patent No. 1,581,112; and U.S. Pats. Nos. 3,423,313; 3,682,114; 3,941,552; 3,950,147; and 3,996,026, all of which are discussed in applicant's copending U.S. Patent Aplication Ser. No. 790,337, filed Apr. 25, 1977, which portion of said application Ser. No. 790,337 is hereby incorporated by reference herein.

In addition to the above-listed patents, McMurtrie, U.S. Pat. No. 3,019,059, issued Jan. 30, 1962, describes a process for transporting finely divided coal solids by forcing through a conduit an aqueous slurry containing up to 50% solids and containing a minor proportion of coal acids which are added to improve pumpability and to prevent settling during pumping. At the receiving end of the conduit, the slurry is filtered or otherwise processed to remove the water and coal acids and to recover the coal solids for use. Alkali metal and ammonium salts of humic acids are included in the term "coal acids".

Also, Reichl, U.S. Pat. No. 3,073,652, issued Jan. 15, 1963 describes a method of transporting coal over long distances for conversion at distant locations which comprises obtaining coal having a spectrum of sizes and between about 20 and 40 percent by weight of (−)325 mesh particles, (−44 μm), preparing a water slurry comprising between 35 and 60 percent by weight of said coal in water, pumping said slurry through a pipeline at a velocity of between about 3 and 7 feet per second over long distances to a distant location, interrupting the transportation of said slurry at said distant location, thereafter removing a portion of said water from said slurry to provide a concentrated slurry having a solids concentration of between 60 and 75 percent by weight of said coal in said water, pumping said concentrated slurry through a second pipeline over a shorter distance to a second location, and converting the coal in said concentrated slurry at said second location, or burning the concentrated slurry directly, if the burner is suitable for such burning.

Also, Clancey et al., U.S. Pat. No. 3,762,887, issued Oct. 2, 1973, describes a homogeneous composition of matter suitable for use as a liquid fuel consisting essentially of particulate coal and water in the relative proportions of 54 to 69 percent by volume of coal (61.3 to 75.0 wgt %) and 46 to 31 percent by volume of water, said particulate coal having a size distribution substantially as follows: 0 percent by weight on 4 mesh Tyler Standard screen, 18 to 33 percent by weight less than 325 mesh, less than 60 percent by weight between 4 and 28 mesh, and the balance in the size range of 28 to 325 mesh. The coal-water slurry is described as being pumpable, storable and directly burnable in a cyclone burner.

Commercially operated coal-slurry pipelines have been in operation for many years in the United States. Such pipelins and their successes, failures, and problems have been described in various publications, including the following:

"The Black Mesa Story" by F. H. Love, *Pipeline Engineer*, November 1969;

"Slurry Pipelines, Energy Movers of the Future" by E. J. Wasp, and T. L. Thompson, *Oil and Gas Journal*, Dec. 24, 1973;

"Research and Development for Slurry Pipeline System Design" by T. C. Aude and R. L. Gandhi, Bechtel, Inc., San Francisco, prepared for delivery at "The Second International Technical Conference on Slurry Transportation", Las Vegas, Nevada, Mar. 2–4, 1977;

"Operating Experiences at the 1580 MW Coal Slurry Fired Mohave Generating Station" by M. L. Dina, presented at The International Conference on Slurry Transportation at Battelle Memorial Institute, Columbus, Ohio, Feb. 3, 1976;

"Utilization of Pipeline Delivered Coal", by P. E. Snoek et al., Bechtel, Inc., San Francisco, for ASME Joint Power Generation Conference, Buffalo, N. Y., Sept. 20, 1976; and "Coal Slurry Pipelines", *Van Nostrand Scientific Encyclopedia*, fifth edition, 1976, page 58.

The problem of preparing coal-water slurry for long distance delivery through pipelines ranging in diameter from about 4" to 48" to be burned at the delivery depot is to be distinguished from the problem of preparing a coal-water slurry from which a more concentrated slurry or a coal "cake" is prepared at a use site and burning the concentrated coal-water slurry or "cake" so prepared. Also, the problem of burning coal-water slurry in a turbulent burner is to be distinguished from burning coal-water slurry in a cyclone burner of a furnace. For examples of burners, see Chemical Technology: *An Encyclopedic Treatment*, J. F. Van Oss, Barnes and Noble Books, Div. Harper & Row, Publ., Inc. N.Y. 1971 Vol. II, Pages 722–725.

BRIEF SUMMARY OF THE INVENTION

This invention relates to a coal-water slurry comprising a high content, e.g. 60–80 wgt. %, dry basis, of finely-divided particles of coal having in combination physical and electrochemical characteristics which provide the slurry with low viscosity and other rheological properties required for transporting the slurry in a pipeline over long distances. The invention further relates to a novel method for making coal-water slurry of the invention.

In one aspect, the invention relates to a coal-water slurry suitable for pipeline transport which comprises:
(i) a coal compact comprising finely-divided coal particles having particle sizes in the range of about 1180 μm to 0.05 μm with at least 5 wgt. % of the particles being of colloidal size, said particles in said compact having a particle size distribution substantially in accordance with the following formula:

$$CPFT = \left[ \frac{D_\mu^n - D_S^n}{D_L^n - D_S^n} \right] \cdot 100, \text{ where}$$

$CPFT$ = cumulative weight percent, dry basis, of particles finer than a particle μ of stated size,
$D_\mu$ = diameter of particle μ,
$D_L$ = diameter of largest particle in compact, sieve size or its equivalent,
$D_S$ = diameter of smallest particle in compact, *SEM* size or its equivalent,
$n$ = numerical exponent, with $n$ being in the range of 0.2 to 1.0, and with all diameters sized in μm, (ii) carrier water in an amount at least sufficient to transport said coal compact in a pipeline,
(iii) counterion charged bound water layers on at least said particles of colloidal size, and
(iv) an effective amount of at least one electrolyte and/or dispersing agent(s) present in said carrier water and providing counterions to said bound water layers on said particles in an amount sufficient to maintain the zeta potential at near maximum zeta potential and sufficient to disperse said coal particles.

The particle size distribution of the coal compact according to the above formula for CPFT provides a non-undulating size distribution of particles which permits closer packing of more particles of coal in a specific volume of space in the compact than can be achieved with a particle size distribution which has an undulating distribution of particles. Also, sizes of $D_L$ and $D_S$ have important effects on the suitability of the particle size distribution for use in the coal-water slurry. When $D_L$ is too large, large particles can settle out and cause pumping problems. When $D_S$ is too large and less than about 5 wgt. %, dry basis, of particles of colloidal size are present in the coal compact, the stability of the yield stress and the rheological properties of the coal-water slurry are adversely affected and the slurry may segregate or become dilatent or otherwise not pumpable. The value of the numerical exponent n in the formula CPFT is affected by the values of $D_L$ and $D_S$. While n will usually range from 0.2 to 1.0, n preferably will be in the range from about 0.2 to 0.7. $D_L$ usually will be in the range from 1180 μm to 38 μm and will preferably be in the range of 70 μm (micrometer or micron) to 600 μm, and most preferably will be about 300 μm. $D_S$ will be less than 3 μm (<3 μm) and usually will be in the range of 0.05 μm to 0.3 μm, and preferably will be about 0.1 μm.

The counterions provided by the electrolyte and/or dispersing agent(s) are of opposite charge to that of the surface of a coal particle, which usually is negative. The counterions also cooperate with counterions which already may be present in the bound water layers on aged wetted coal particle surfaces to provide bound water structures which help to provide zeta potential to disperse the coal particles in the compact in the carrier water, due to the repulsive electrical charges on the particles. These ions also help to affect the structure of the bound water layers to permit close packing of the particles, and thereby provide the yield pseudoplastic rheological properties to the slurry. When the surfaces of the coal particles are freshly wet milled surfaces, the electrolyte and/or dispersing agent and the carrier water present during milling cooperate to provide the particles immediately with "near maximum zeta potential" required for dispersion of the particles in accordance with the invention. A near maximum zeta potential is beneficial and must be maintained. Allowing the zeta potential to rise to maximum is detrimental as discussed below.

The amount of coal present in the coal-water slurry usually will range from about 45% to 80%, or even higher, by weight, dry basis. Preferably, the amount of coal will be from about 65% to 80% by weight, dry basis. The amount of electrolyte and/or dispersing agent(s) usually will range up to about 4 wgt. % based on total weight of dry coal, and preferably will range from 0.05 to 2.0 wgt. %, same basis. The amount of carrier water will be an amount sufficient to bring the total weight of coal-water slurry to 100% by weight. Slurry Brookfield viscosity usually will be less than about 3000 cps at 60 rpm. For example, a coal-water slurry made at 76.1 wgt. % coal, dry basis, was found to have a viscosity of about 2000 cps, see FIG. 1, B and C.

The specific electrolyte and/or dispersing agent(s) present in the slurry and its amount have been found to be peculiar to coal from a particular source and to the carrier water used. Accordingly, the electrolyte and/or dispersing agent(s) and its amount needed for dispersing a particular coal in a particular carrier water in making the coal-water slurry preferably is selected by a method involving a series of laboratory titrations wherein the zeta potential is measured in a standard way. The candidate electrolytes and/or dispersing agent(s) are tested to determine their zeta potential maximizing propensities on a <10 μm sample of particles of coal from the above coal compact from a standard sized mass of the coal stirred in a sample of the carrier water. Optimum amounts of agent or agents are similarly determined.

In an equivalent selection method, the electrolyte and/or dispersing agent is selected by measuring shear rate versus viscosity of a stirred suspension of the coal particles in a sample of the carrier water while titrating with increasing amounts of the agent(s). It has been found that maximum zeta potential values correlate well with a leveling off in Brookfield viscosities of the slurry as increased amounts of a particular agent are added in increments.

In another aspect, the invention relates to an improved method for preparing a coal-water slurry suitable for pipeline transport comprising dispersing finely-divided coal particles in water, characterized by the steps which comprise:

(i) providing a coal compact comprising finely-divided coal particles having particle sizes in the range of about 1180 μm to 0.05 μm with at least 5 wgt. % of the particles being of colloidal size, said particles in said compact having a particle size distribution substantially in accordance with the following formula:

$$CPFT = \left[ \frac{D_\mu{}^n - D_S{}^n}{D_L{}^n - D_S{}^n} \right] \cdot 100, \text{ where}$$

CPFT = cumulative weight percent, dry basis, of particles finer than a particle μ of stated size,
$D_\mu$ = diameter of particle μ,
$D_L$ = diameter of largest particle in compact, sieve size, or its equivalent
$D_S$ = diameter of smallest particle in compact, SEM size, or its equivalent
$n$ = numerical exponent, with n being in the range of 0.2 to 1.0, and with all diameters sized in μm, (ii) providing carrier water in a total amount at least sufficient to transport said coal compact in a pipeline,
(iii) determining the voltage and polarity of the zeta potential of a sample of coal particles from said coal compact when dispersed in a sample of said carrier water,
(iv) determining from the results of step (iii) the type and amount of zeta potential enhancing electrolyte and/or dispersing agent(s) needed to adjust the zeta potential of at least the colloidal particles of said coal compact when mixed with said carrier water to a voltage near maximum zeta potential and sufficient to disperse said coal particles,
(v) providing in said coal compact of step (i), or in said carrier water of step (ii), or in a mixture thereof the type and amount of zeta potential enhancing electrolyte and/or dispersing agent(s) determined to be needed from step (iv),
(vi) blending said coal compact, carrier water, and electrolyte and/or dispersing agent(s) together to form said coal-water slurry.

In a preferred embodiment, a novel coal-water slurry containing in the range of 45% to 80% by weight of coal, dry basis, is prepared by the method which comprises:

(i) pulverizing, in the presence of a pre-determined portion of the total amount of at least one electrolyte and/or dispersing agent(s) and in a minor amount of all the carrier water needed to transport said coal-water slurry in a pipeline, a first fraction of coal to prepare a pulverized dispersed coal fraction having particles substantially all finer than about 300 μm,
(ii) providing with a major amount of all said water and in the presence of the remaining portion said predetermined amount of said at least one electrolyte and/or dispersing agent(s) a second fraction of pulverized dispersed coal having coal particles of a fineness such that, when blended with said first fraction of coal particles to form a coal compact, the total blended mass will form a compact which contains a net of about 10 wgt. % of particles which are less than 3 μm in size,
(iii) blending said first and second fractions together in amounts by weight sufficient to provide a coal-water slurry having a coal compact with coal particles having a size in the range of about 300 μm×0.1 μm with at least about 10 wgt. % of said particles less than 3 μm in size and distributed substantially in accordance with the following formula:

$$CPFT = \left[ \frac{D_\mu{}^n - D_S{}^n}{D_L{}^n - D_S{}^n} \right] \cdot 100, \text{ where}$$

CPFT = cumulative weight percent, dry basis, of particles finer than a particle μ of stated size,
$D_\mu$ = diameter of particle μ,
$D_L$ = 300 μm, sieve size, or its equivalent
$D_S$ = diameter of smallest particle in compact, SEM size, or its equivalent
$n$ = numerical exponent, with n being in the range of 0.3 to 0.5, and with all diameters sized in μm.

In a most preferred embodiment, the above preferred method includes the further improvement wherein: said total amount of said at least one electrolyte and/or dispersing agent(s) being pre-determined by:

(iv) determining the voltage and polarity of the zeta potential of a sample of coal particles milled to <10 μm from said coal and dispersed in a sample of said carrier water, and
(v) determining from the results of step (iv) the type and amount of zeta potential enhancing electrolyte and/or dispersing agent(s) needed to adjust the zeta potential of at least the colloidal particles of said coal compact when mixed with said carrier water to a voltage near maximum zeta potential and sufficient to disperse said coal particles.

Preferably, the electrolyte and/or dispersing agent(s) will be an organic anionic surfactant, or an inorganic salt selected from NaOH, $K_2CO_3$, or $Na_2SiO_3 \cdot 9H_2O$. Most preferably, a combination of the organic anionic surfactant and at least one of the above electrolytes is used.

The coal preferably will be de-ashed to remove a substantial amount of unwanted minerals, such as clays and sulfur.

DEFINITION OF TERMS

The following definitions of terms are provided for a clearer understanding of the invention.

Particles of solids, their sizes and other characteristics, and methods for determining their sizes and size distributions and other characteristics in a "consist" are well-known. As used herein, and in the prior art, the term "consist" means the particle size distribution of the solid phase of the coal-water slurry. For example, in the prior art, the term "8 mesh ×0" indicates coal with a graded size, or consist, of coal particles distributed in the range of 8 mesh and zero (dust), or 2360 μm× zero (dust). Similarly, as used herein, the term "about 1180 μm×0.05 μm" is intended to mean and indicates coal with a nominally measurable graded size, or "consist" of coal particles distributed in the range of from about 1180 microns to a measurable colloidal size, e.g. at least about 0.05 microns. The term "about 1180 microns" is nominally equivalent to a U.S. Series 16 mesh sieve, substantially as defined in *Handbook of Chemistry and physics,* 54th Edition 1973-1974 CRC Press, Cleveland, Oh., page F-143 "Standard Test Sieves (wire cloth)". Unless otherwise stated, the weight of coal is on a moisture free or "dry basis" herein.

The term "coal compact" as used herein defines a mass of finely-divided coal particles which are closely packed in accordance with the invention.

The term "Alfred formula consist" defines a particle size distribution in accordance with the Alfred formula.

The term "Alfred formula compact" defines a coal compact having an "Alfred formula consist".

The term "Alfred formula coal-water slurry" defines a coal-water slurry made with an "Alfred fromula compact" and/or a coal-water slurry wherein the coal consist is an "Alfred formula consist".

The term "pulverized coal" or "P.C." as used in the prior art defines coal which has been milled or ground to a "consist" of about 40 mesh × 0 as indicated in *Handbook of Chemistry and Physics,* supra, 51st Edition, 1970 1971, page F-199. Unless otherwise indicated, the term "P.C." has the same meaning herein.

In view of the manner in which coal fractures during milling, coal particles will have irregular shapes which, however, are of a body, or maximum side-to-side thickness, such that the sub-sieve sized discrete particles will pass through a specified mesh of a sieve. The size of the discrete particle can be exxpressed in terms of a spherical diameter which, as used herein, is defined as a U.S. sieve size of from 16 mesh to 400 mesh (38 $\mu$m) or its equivalent in microns through which a coal particle from a sample of coal or coal-water slurry will pass. For particles finer than 200 mesh, the size of the particles can be expressed in $\mu$m as determined by means of a sieve, or a Sedigraph, or a scanning electron microscope (SEM). Accordingly, both sieve size and SEM sizes or their equivalents, however determined, are used in describing the invention.

Means for crushing, milling, including ball milling and roller milling, disc grinding, screening, recycling, dry (air) and wet (water) separating, and blending or otherwise combining coal fractions to obtain a compact of a desired particle size and consist are well known, as may be ascertained from the above cited prior art.

For measuring particle sizes and for determining particle size distributions of pulverized and fine grind coal particles used for preparing a coal-water slurry of the present invention, the following three means of measuring particle sizes were used and are preferred:

1. U.S. Series sieves Nos. 16, 20, 30, 40, 50, 70, 100, 140, and 200 were used to determine weights of coal particles passing through each sieve in the range of about (−) 1180 $\mu$m to (−) 75 $\mu$m, including $D_L$ where it is at least 75 $\mu$m in size in the coal and the coal-water slurry. The cumulative weight percents of coal articles, dry basis, finer than (CPFT) a particular stated sieve size in microns were charted against the sizes in microns on a log-log chart, referred to herein as a "CPFT chart", to indicate the nature of the particle size distribution of 20 mesh × 200 mesh particles, substantially as shown in FIGS. 9–12.

2. A Sedigraph 5500L (made by Micromeritics, Co., Ga., U.S.) was used to measure particle sizes and numbers of particles in coal and in the coal-water slurry in the range of (−) 75 $\mu$m to about 0.3 $\mu$m. The Sedigraph 5500L uses photo-extinction of settling particles dispersed in water according to Stoke's law as a means for making the above determinations. Although some measure of inaccuracy exists in measuring the range above 30 $\mu$m and below 1 $\mu$m, the determinations are found to be reasonably accurate and suitable for purposes of the invention in the range of 30 $\mu$m to 0.1 $\mu$m. Other instruments, such as a Coulter Counter can also be used for similar accuracy. The results were plotted on the above CPFT chart.

3. A scanning electron microscope (SEM) at 40,000 × magnification was used to determine $D_S$ in the colloidal range below 1.0 $\mu$m in the coal compact or in the coal-water slurry. The determination is made by preparing a dilute suspension of coal particles or by diluting a sample of disperse coal-water slurry to a dilution of about 10 wgt. % of coal per weight of solution. The dilute suspension is allowed to settle for two hours, (for example in a 100 ml graduate) and samples of the finest sizes are taken from the top one ml. of the suspension. This sample is further diluted with alcohol, and the diluted suspension or dispersion is examined on a copper pedestal using the SEM in a known way to find and measure the diameter, $D_S$, of the smallest coal particle. This data is also plotted on the above CPFT chart. The plots from the three measurements are connected to obtain a "CPFT chart line", or curve.

It is to be noted that in view of the nature of the measuring means available, the values of $D_L$ and $D_S$ must be considered as values which are precise only within the limits of the means used for their determination.

In addition to the above, particle size measurements can be estimated from methylene blue index measurements to obtain an approximate determination of the wgt % of colloidal particles of size below about 1 $\mu$m. Such a procedure is described in A.S.T.M. Standard C837-76.

The term "particle size distribution line" as used herein in relation to a coal particle compact herein means a "CPFT chart line" representative of the consist of the coal compact, (i.e. its particle size distribution) measured as described above. For example, when CPFT, e.g. in wgt %, is plotted against particle sizes, e.g. in microns ($\mu$m) on a log-log chart, a smooth line is formed on the chart when the points of the plots are connected by a continuous line. The "CPFT chart line" may be straight or curved and may have a slope of up to 1.0, but should be substantially free of peaks and valleys, referred to herein as "inflections" or "undulations", indicative of irregularities in content of amounts of the various particle sizes required in a compact in order for a non-undulating CPFT chart line to be obtained.

Preferably, the CPFT chart plot line should be a smooth, or substantially "non-undulating", line from 100% to 1% CPFT. A "non-undulating line" is defined herein as a CPFT chart line of which the slope of a tangent at any point on the chart line is within the upper and lower values for n in the Alfred formula. Small undulations, within these outer limits for n may be tolerated. Large undulations may render slurry unsuitable for pumping especially at high concentrations, e.g. over 65 wgt. %. The particle size distribution of coal particles in the compact depicted by the non-undulating line of the chart will correlate with a "smooth" distribution of particles of sizes ranging from $D_L$ to $D_S$. The significance of this distribution will be discussed later herein in relation to the packing of particles in accordance with the invention.

The term "high solids content slurry" means a coal-water slurry, e.g. over about 60 wgt. %, dry basis, wherein the coal solids are present at a solids loading level at which interparticle reactions would normally prevent fluidity of the slurry, making it unpumpable; the fluidity required for pumping is obtained and maintained by practice of the method of this invention as herein described.

The term "zeta potential", which is used in describing the invention herein, has the meaning given it in the field of colloid chemistry. Concise discussions and descriptions of the zeta potential and methods for its measurement are found in many sources, including, T. M. Riddick, U.S. Pat. No. 3,454,487, issued July, 1969; Douglas et al., U.S. Pat. No. 3,976,582, issued Aug. 24, 1976; *Encyclopedia of Chemistry*, 2nd edition, Clark et al., Reinbold Publ. Corp. 1966, pages 263–265; *Chemical and Process Technology Encyclopedia*, D. M. Considine, editor-in-chief, McGraw-Hill Book Company, N.Y., pages 308–309; *Chemical Technology: An Encyclopedic Treatment*, supra, Vol. VII, pages 27–32; Kirk-Othmer, *Encyclopedia of Chemical Technology*, 2nd Edition, Vol. 22, pages 90–97; and T. M. Riddick, *Control of Colloid Stability Through Zeta Potential*, Zeta-Meter, Inc. New York City.

"Zeta potential" may be measured by conventional techniques and apparatus of electroosmosis such as those described, e.g., in Potter, "Electro Chemistry"; Cleaver-Hume Press, Ltd.,; London (1961). Zero potential can also be determined by measuring electrophoretic mobility (EPM) in any of several commercial apparatuses. In the present invention, a Pen-Kem System 3000 (made by Pen-Kem Co. Inc. of Croton-on-Hudson, N.Y.) was used for determining zeta potential in the examples herein. This instrument is capable of automatically taking samples of coal particles and producing an (EPM) distribution by Fast Fourier Transform Analysis of millivolts from which the zeta potential can be calculated.

The zeta potential is measured using very dilute samples of the $<10$ $\mu$m sized coal particles in the coal compact of the coal-water slurry. The zeta potential is measured both to determine its polarity and charge in millivolts and to determine the effectiveness of a dispersing agent or combinations thereof, such as surfactant combinations, alone or with inorganic electrolytes present, for providing a suitable near maximum zeta potential for the coal particles in the coal-water slurry.

"Near maximum zeta potential", as used herein, means a value of zeta potential, measured at constant electrical conductivity, below the maximum zeta potential as defined and discussed in the references above. It is necessary to normalize the zeta potential values with respect to electrical conductivity, since zeta potential is, itself, a function of the electrical conductivity. This is a function of the above instrument. The term "near maximum zeta potential", as used herein means a zeta potential having a value in the range of about $-40$ to $-70$ millivolts, compared to an absolute maximum zeta potential, e.g. of about $-80$ to $-100$ millivolts, found to be obtainable in samples of Alfred formula coal-water slurry. The near maximum zeta potential must be of a millivoltage and polarity sufficient to provide coal particles with a repulsive charge great enough to disperse the coal particles in an Alfred formula coal-water slurry. However, the potential should not be allowed to reach a maximum millivoltage zeta potential, because the polarity of the charge on the particles may be reversed, causing the particles to flocculate. The zeta potential, therefore, need only be within close range of the maximum zeta potential to be effective for maintaining a coal-water slurry of the invention in a yield pseudoplastic rheology suitable for pipeline transport.

The term "surface-active agent", or "surfactant", as used in the prior art indicates any substance that alters energy relationships at interfaces, and, in particular, a synthetic organic compound displaying surface activity including wetting agents, detergents, penetrants, spreaders, dispersing agents, foaming agents, etc. *Concise Chemical and Technical Dictionary*, H. Bennett, Chemical Publ., Inc. N.Y., 1962.

The term "dispersing agent" as used herein is a form of surface-active agent which may be organic or inorganic and which is present on or in or is added to the coal or water or to the coal-water slurry and acts to create or to promote formation of a repulsive electrostatic charge on a coal particle in an aqueous medium at the interface of the bound water layer on a particle and of the diffuse layer of the bulk or "carrier water" surrounding the particle, thereby creating or amplifying the zeta potential, or electrostatic charge at the interface.

The term "wetting" as used herein indicates covering or penetrating the coal particle surface with a bound water layer. The terms "wetting agent" or "surfactant" as used herein indicate a dispersing agent which acts to provide or promote "wetting" of the coal particle surface. The term "surfactant" includes both organic and inorganic surfactants. Some coal surfaces are inherently wetted as mined and milled and may not require the aid of an additional wetting agent for practicing the present invention. As used herein "wetted coal" means both coal which has been wetted with a "wetting agent" and coal which is "wetted" by natural means when mined.

The term "deflocculating" as used herein indicates formation of a colloidal dispersion of colloid sized coal particles. "Colloids" are substances of which at least one component is subdivided physically in such a way that one or more of its dimensions lies in the range of 100Å and 3 $\mu$m. As is known, these are not fixed limits and, occasionally, systems containing larger particles are classed as colloids. See *Encyclopedia of Chemistry*, supra, page 263. The term "deflocculating agent" as used herein indicates a dispersing agent which promotes formation of a colloidal dispersion of colloidal sized particles in the coal-water slurry.

In accordance with the above definitions, the term "dispersing agent" as used herein includes surface-active agents which also may be "wetting agents", "surfactants" and/or "deflocculating agents", any and/or all of which can be used to create or to amplify the zeta potential on a coal particle in an aqueous medium to a near maximum zeta potential in accordance with known ways in the preparation of a coal-water slurry in accordance with the method of the present invention.

The term "Brookfield viscosity" is used herein to define "viscosity" as measured by the conventional technique used in determining viscosity by means of a Brookfield Synchro-Lactric Viscosimeter (made by the Brookfield Engineering Laboratories, Stoughton, Mass.). The Brookfield viscosity as reported herein, unless stated otherwise, was measured as centipoises (cps) at 60 rpm. Coal-water slurry made according to the present invention usually is a non-Newtonian fluid having yield pseudoplastic rheological properties, and as such has no ordinary viscosity. A "yield pseudoplastic fluid" is a power law fluid with a yield stress as more fully defined herein.

The term "electrolyte" means any substance which dissolves into electrically charged ions when dissolved in water or other polar solvent in the coal-water slurry. Thus, the substance can be an acid, base, or salt. Certain electrolytes have been found more beneficial than others for the practice of the present invention, as more fully discussed herein.

The term "stability" as used herein includes static and dynamic stability and as applied to a coal-water slurry of this invention means the capability of the slurry to maintain its level of homogenity over a selected period of time, such as, for example, a time measured from formation of the slurry with its particles dispersed at near maximum zeta potential to the time at which the slurry tends to undergo a change in its rheological properties. The term stability implies that the physical state of the slurry will not readily change or undergo fluctuations which would impair its use. For example, it implies that coarser particles will not settle out of the suspension and that neither segregation of coarse from fine particles nor flocculation of the coal particles will occur. Segregation of particles would alter particle packing efficiency and adversely affect the rheological properties of the slurry.

The term "bound water" as used herein means water retained in the "bound water layer" as defined and illustrated at page 91 of Kirk-Othmer, above, and as illustrated in FIG. 8 hereof and includes a fixed water layer adjacent to the surface of a particle.

The term "carrier water" as used herein means the bulk or free water dispersed between the coal particles and contiguous to the bound water layers on the particles. Zeta potential as used herein means the charge present at the interface of the bound water layer and the carrier water.

The term "yield pseudoplastic fluid" as used in describing the invention has the usual meaning associated with it in the field of fluid flow. Specifically, a yield pseudoplastic fluid is one which requires that a yield stress be exceeded before flow commences, and one whose apparent viscosity decreases with increasing rate of shear. In a shear stress vs. shear rate diagram, the curve for a yield pseudoplastic fluid shows a non-linearly increasing shear stress with a linearly increasing rate of shear. In a "pure" pseudoplastic system, no yield stress is observed so that the curve passes through the origin. However, most real systems do exhibit a yield stress indicating some plasticity. For a yield pseudoplastic fluid, the viscosity decreases with increased shear rate. This is an indication that the lower the yield stress, the more pumpable such a fluid will be.

BRIEF DESCRIPTION OF THE DRAWINGS

The present invention will be more fully understood by reference to the following detailed description thereof, when read in conjunction with the attached drawings, wherein like reference numerals refer to like elements and wherein;

Referring to FIG. 1, FIG. 1, A is a viscosity curve derived from Alfred formula coal-water slurry having a consist according to blend A of FIG. 11; FIG. 1,B is a viscosity curve derived from Alfred formula coal-water slurry having a consist according to blend B of FIG. 11; FIG. 1,D is a viscosity curve derived from Alfred formula coal-water slurry having a consist according to blend C of FIG. 11; FIG. 1, C is a viscosity curve derived from Alfred formula coal-water slurry having a consist according to the Alfred formula milled W. Virginia coal of FIG. 12.

FIG. 6 is a flow diagram illustrating an integrated process for preparing Alfred formula consist coal-water slurry and utilizing the slurry in a furnace.

FIG. 7 is a cross-sectional view of a typical atomizer, or turbulent flow, burner in which Alfred formula consist coal-water slurry can be burned.

FIG. 2 is based on the data shown in FIG. 13. Negative slope in FIG. 13 indicates yield pseudoplasticity and the lowest 30 rpm viscosity with yield pseudoplasticity indicates an optimum amount of dispersing agent to use to obtain an optimum slurry. Zeta potential measurements can be made at each addition and correlated to the wgt. % of dispersing agent at each reading as shown in the inset.

DETAILED DESCRIPTION OF THE INVENTION

Figure 2:
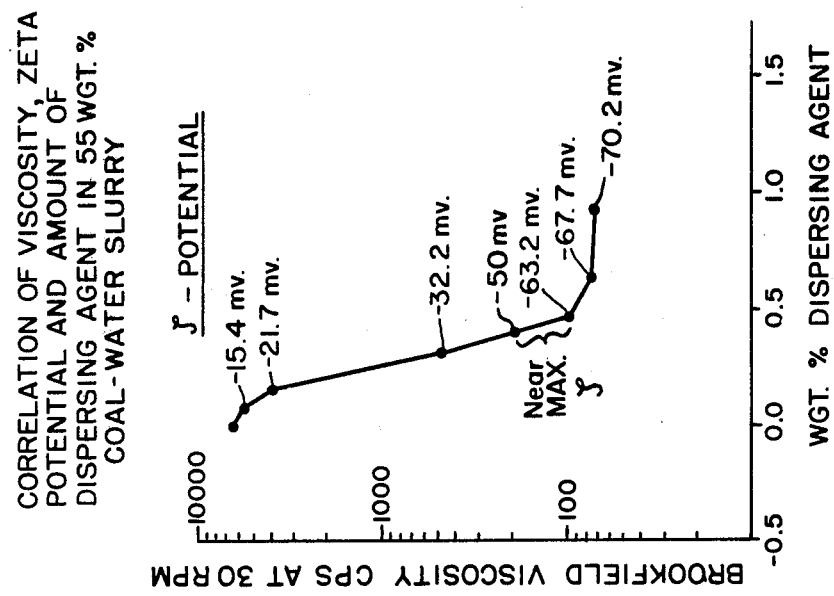
FIG. 2 is a chart showing correlation among Brookfield viscosities in cps at 30 rpm, zeta potentials in millivolts (mv) and percents of dispersing agent used in determining amount of dispersing agent needed to obtain near maximum zeta potential in a 55 wgt. % coal-water slurry as further shown in FIG. 13.

As is well known, pipeline transportation of coal-water slurry may create many mechanical problems, such as, line plugging, settling during shut-down of flow, start-up of flow after shut-down, slope of pipelines, and corrosion and erosion of pipelines. Many of these problems have been overcome by the known processes. However, current technology still requires that the coal-water slurry be pumped in a turbulent regime, at a rate higher than a usual minimum velocity for a fluid of similar viscosity, in order to maintain the coal and water mixed in the slurry. Consequently, the known coal-water slurry pipeline systems must be operated either at a high flow rate or stopped.

Also, coal-water slurry preparation and usage as presently practiced create major economic problems including providing an adequate supply of water for slurry preparation, and involving expensive processing operations, such as, for dewatering and drying of coal, which in prior art processes is recovered as about 75% coal centrifuge cake from the coal-water slurry, at the delivery site for burning in furnaces. A further major economic problem which exists is that "underflow" from the dewatering operation causes a serious disposal problem for effluent coal fines, as well as being a significant economic waste of the coal fines. For example, Dina, supra, reports that to 1976 over 400,000 tons of underflow had not been utilized because of inability to burn it, or to difficulties associated with processing it.

Accordingly, at the time of this invention a great need existed for an improved high solids content coal-water slurry which can be easily prepared, which has static and dynamic stability and can be pumped through a pipeline for long distances at controllable speeds, and which then can be burned directly in a turbulent (atomizer) burner with a minimum amount of $NO_x$ formation, as well as in a cyclone burner furnace intended to burn low-grade coal having a high ash content. The present invention provides such a coal-water slurry and significantly avoids many of the above mentioned mechanical, dewatering, and waste problems. Furthermore, the rheological properties of the coal-water slurry are such that the pumping rate of the slurry in a pipeline can be controlled, i.e. accelerated or decelerated, to accommodate varying demand rates at the user's facilities, without causing flocculation or settling of larger particles in the pipeline.

The present invention relates to a novel coal-water slurry of high solids content and of relatively low viscosity which usually has yield pseudoplastic rheological properties to enhance controllable pumpability, to permit storing prior to use, if desired, and to permit direct burning of the slurry. In the slurry, a compact of comminuted coal particles of an advantageous particle size distribution and having a content of a critical amount of particles of colloidal size is maintained by means of an electrolyte and/or dispersing agent in deflocculated condition with at least the colloidal particles at near maximum zeta potential in the carrier water. The larger coal particles in the slurry thereby are dispersed, and the slurry may be further rendered rheologically yield pseudoplastic by providing in the slurry a further effective amount of the electrolyte and/or dispersing agent(s) which preferably is an organic or inorganic surfactant, an inorganic electrolyte, or a combination of both, and which serves further to maintain the particles at near maximum zeta potential.

The invention also relates to a method for preparing such a novel coal-water slurry having its advantageously distributed coal particles maintained at near maximum zeta potential.

The invention further relates to utilizing coal-water slurry of the invention as a fuel for generation of heat and/or electrical energy in a suitable furnace, and for other uses, such as chemical, gasification and/or metallurgical uses, to all of which uses the slurry can be delivered by pipeline and conveying means for said slurry, such as pumps, at controllable flow rates.

The coal-water slurry of this invention is especially advantageous in that the slurry can be prepared for most uses at a 70–80 wgt % (dry basis) coal-water slurry which can be prepared at a distant location, pumped through suitably sized pipelines, such as those now in commercial use, and used directly in many cases without the need for dewatering of the slurry after pumping or without need for concentration of the slurry, for example, by evaporation, to obtain a burnable product, and/or to remove water which would interfere with the particular use intended.

In the prior art, the efficiency of coal-water slurry transportation is stated to depend upon a number of variables, the most important of which from an hydraulic standpoint are listed as (1) size consist; (2) velocity; and (3) concentration. The selection of a proper consist (size gradation) is stated to be important in order that homogeneous flow can be achieved at economic operating velocities. In the above described commercial Black Mesa 50 wgt % coal-water slurry, such a consist is of 8 mesh by 0 (approximately 0.1 inch particle size to dust). Homogeneous flow (solids evenly distributed across the pipe diameter) is stated to be important if excessive wear in the bottom of the pipe is to be avoided and stable operation achieved.

The prior art further teaches that equally important and directly related to size consist is the proper selection of velocities for transport. The velocity cannot be excessive so as to cause abrasion of pipe wall and high-pressure drops. Conversely, the velocity should not be so low as to cause heterogeneous flow, with resultant excessive wear in the pipe bottom or bed formation which will cause unstable operation. Generally, practical operating velocities with the above 50 wgt % coal-water slurry are taught to be in the range of 4 to 7 feet per second.

Finally, slurry concentration must be considered. The relationship between concentration and viscosity for any given slurry can be determined in laboratory bench testing. Although it varies for different slurries, all prior art systems generally demonstrate a point in inflection where a small increase in concentration causes a large viscosity increase. Hence, with such systems it is important to maintain a concentration range below the inflection point in order to provide good operation without excessive velocities. For coal, the practical concentration range of prior art coal-water slurry appears to be from 45 to 55% solids, according to the above-cited *Van Nostrand Scientific Encyclopedia* summary of coal slurry pipeline technology.

In contrast to the above limitation of concentration of coal-water slurry solids to 45 to 55 wgt % solids, dry basis, for pipeline transportation, the present invention provides a high solids content coal-water slurry having from 45 to 80 wgt %, or more, dry basis, coal solids concentration for pipeline transportation at velocities which can be less than those needed with the prior art systems, if desired, but which can be at least as high as those of the prior art. Furthermore, an inflection point in flow where a small increase in concentration causes a large increase in viscosity has not been evident in flow of Alfred formula coal-water slurry. Instead, it has been found that the change in viscosity with increase in concentration is a gradual change in keeping with the yield pseudoplastic rheological properties of the slurry.

The invention is also beneficial and advantageous in that the amount of water required to prepare and pump the 75 wgt % slurry is about ⅓ that required to prepare and deliver 50 wgt % coal-water slurries via long distance pipelines. For example, a coal-water slurry at 50 wgt % solids requires about 250 gals. of water per ton of dry coal, while slurry of this invention at 75 wgt % solids content requires about 83 gals. of water per ton of dry coal. Moreover, because water in a 70 to 80 wgt % coal-water slurry of this invention does not need to be removed from the slurry in order to be able to burn the coal, a considerable reduction results in the cost of the pipeline-delivered coal-water slurry. Furthermore, no waste "underflow" fines are left over to be dumped into a waste pond with the attendant evaporation of waste water required to form a dry mass. Such "waste water" is defined as brown or black water which for environmental protection purposes may not be allowed to seep into streams or water tables and therefore must be evaporated in order to dispose of the water content of the "underflow".

In summary, the Alfred formula coal-water slurry is a novel combination of coal particles and carrier water wherein the particle sizes and their distribution are controlled in accordance with a particle size distribution formula which is especially beneficial for providing a coal compact with a minimum amount of void space between particles and a maximum amount of particle surface area with an advantageous amount of colloidal sized particles present, all of which features combine to enhance the dispersing effects generated by electrolytes and/or dispersing agents selected to provide a near maximum zeta potential to the particles and are added to disperse them and to thereby provide low viscosity to the resulting yield pseudoplastic coal-water slurry. The low viscosities obtained, e.g. 1000 cps at 75 wgt. % coal, dry basis, as shown for example in FIG. 1 C, are so far as is known to the inventor hereof, significantly lower than viscosities of pipeline pumpable coal-water slurries of the prior art at similar solids content. Accordingly, the Alfred formula coal-water slurry hereof represents an advantageous and beneficial improvement in the coal-water slurry art to which the claims hereof are directed.

The coal-water slurry of the invention is prepared by a process which comprises in combination at least three steps which cooperate to achieve production of a high solids content pipeline pumpable coal-water slurry suitable for transport in long distance pipelines. These three steps and their functions may be summarized as follows:

(i) providing a coal compact of finely-divided coal particles wherein the particle size distribution is designed to minimize the void space between particles and to maximize the packing efficiency of coal particles of a broad spectrum of particle sizes in the range from 1180 $\mu$m to 0.05 $\mu$m, thereby also providing an optimum amount of particle surface area in the compact.

(ii) providing an effective amount of an electrolyte, which may be a dispersing agent, in carrier water to provide advantageous counterions to the bound water layer surrounding each coal particle, thereby to enhance the structure and electrochemistry of the bound water layer and to minimize the total water content of the slurry, and, (iii) dispersing the coal particles of the coal compact in a sufficient amount of carrier water by means of a dispersing agent which is effective to raise and maintain zeta potential of the coal particles dispersed in the carrier water and which is provided in an amount sufficient, alone or in combination with the electrolyte, to provide the coal particles in the coal-water slurry with a zeta potential which is near, but essentially below, the maximum zeta potential to which the coal particles could be raised in the slurry, thereby promoting yield stress required in a slurry having yield pseudoplastic rheology while avoiding dilatency which could cause pumping difficulties.

The particle size distribution, or consist, of the present invention, provides a major means for minimizing the carrier water content of the slurry and minimizes the porosity of the packed coal particles of the coal compact which must be filled with carrier water before adequate fluidity for transportation of the coal-water slurry in a pipeline is obtained. The principle on which this is based may be explained as follows.

In the case of a theoretical powder which consists of mono-sized spheres which pack in a simple orthorhombic array, the volume percent solids is calculated to be 60.51% and the porosity to be 30.49%. By filling the interstices with spheres which exactly fit into the voids, it is calculated that the solids content becomes $(0.6041 \times 0.3039 + 0.6051) \, 100 = 84.48\%$ and the porosity is reduced to 15.59%. This procedure can be repeated with still smaller spheres to further reduce the porosity. Andreasen, cited in G. Herdan, *Small Particle Statistics*, 2nd Edition, Butterworth, London (1960), in 1929 showed a particle size distribution with a power law function which he described by the equation $CPFT = (\mu/D)^n \cdot 100$ and which he believed will produce optimum packing of particles when n is between 0.33 and 0.50. In Andreasen's formula, CPFT = cumulative weight percent of particles finer than a selected particle size in microns $\mu$ = any selected particle size in microns D = the largest particle size in microns in the mass n = slope of the plotted line of the values of CPFT vs particle size in microns on a log-log chart.

Andreasen's power law function in effect teaches perfect packing by ignoring the size of the smallest particle size, which therefore can be infinitely small. In comparing chart lines of the particle size distributions of prepared compacts of the present invention with Andreasen CPFT chart lines, it was found that the Andreasen formula did not provide chart lines which properly fit the distributions for the coal compacts found to provide low viscosities. It is believed that the reason for this discrepancy is that, as a practical matter, any particle size distribution must contain a finite smallest size for a particle, which Andreasen's formula does not do.

Therefore, a correction was made in the Andreasen formula to take into account the size of a finite sized smallest particle. Accordingly, a new expression for particle packing was derived which is as follows:

$$CPFT = \left[\frac{D_\mu^n - D_S^n}{D_L^n - D_S^n}\right] \cdot 100,$$

where $D_S$ is the smallest particle size, and CPFT and $D_L$ are the same as in Andreasen's formula above, $D_\mu$ is diameter of a particle $\mu$ of a stated size, and n is a numerical exponent. The modified Andreasen formula is referred to herein as the "Alfred consist formula" for particle size distributions. It depicts closely the particle size parameters needed for describing practical particle packing in a coal compact of this invention and in similar compacts.

In the Alfred consist formula, the value of n is dependent on the sizes of $D_L$ and $D_S$. The size of $D_L$ for a particular coal is a fully controllable function of the grinding operation. It can be controlled by grinding coal until a desired size of $D_L$ is obtained. The size of $D_S$ is a less controllable function. It is dependent on the grindability of a particular coal, and will usually be the same $D_S$ size for that coal ground in the same mill. However, in some cases, it may be advantageous to obtain a larger $D_S$, for example, by screening out fine particles below a selected particle size.

The Alfred formula was used to prepare a series of computer printouts of CPFT values for various stated particles $\mu$ over a range of particle sizes for $\mu$ ranging from $D_S$ to $D_L$ for a range of nominal exponent n values in a parameter range which would provide at least 5 wgt. % of particles of size <3 $\mu$m for each value of n at selected $D_L$ and $D_S$ values.

Illustrative typical and preferred values computed for typical consists of coal compacts which can be made in accordance with the Alfred formula while meeting the above limitation of at least 5 wgt. % of (−)3 $\mu$m particles in the compact are shown in Tables 1, 2 and 3.

Table 1 illustrates the compositions of typical and preferred consists of 1180 $\mu$m×0.3 $\mu$m coal compacts which can be made in accordance with the Alfred formula for coal compacts having $D_L$ of about 1180 $\mu$m, $D_S$ of about 0.3 $\mu$m and nominal n values of 0.1, 0.2, 0.35 and 0.4 while providing at least 5 wgt. % of particles of minus 3 $\mu$m size. From the data, it is seen that at an n value of 0.1, the consist will have CPFT of about 19.5 wgt. % of a stated particle $\mu$ of <3 $\mu$m size, and at an n value of 0.4, the consist will have CPFT of about 5.7 wgt. % for a stated particle $\mu$ of <3 $\mu$m.

Table 2 illustrates the compositions of typical and preferred consists of 300 $\mu$m×0.3 $\mu$m coal compacts which can be made in accordance with the Alfred formula for coal compacts having $D_L$ of about 300 $\mu$m, $D_S$ of about 0.3 $\mu$m and nominal n values of 0.2, 0.3, 0.5 and 0.6 while providing at least 5 wgt. % of particles of minus 3 $\mu$m size. As can been seen from the data, at an n value of 0.2, the consist will have CPFT of about 20.5 wgt. % for a stated particle $\mu$ of <3 $\mu$m size, and at an n value of 0.6, the consist will have CPFT of about 5.0 wgt. % for a stated particle $\mu$ of <3 $\mu$m size.

Table 3 illustrates a range of coal consists with particle sizes denominated by usually used U.S. sieve mesh sizes as well as corresponding particle sizes in $\mu$m. The values for nominal wgt. % of particle $\mu$ finer than 3 $\mu$m and the nominal n limits where $\mu$ is (−)3 $\mu$m when CPFT is present at less than 5 wgt. % are tabulated from computer printout tables such as those shown in Tables 1 and 2. Consist Examples No. 1-22 were all computed with decreasing values for $D_L$ and a constant value of 0.3 $\mu$m for $D_S$. Consist Examples 23-28 were computed with a constant value of $D_L=300$ $\mu$m (about 50 mesh) and values of $D_S$ which varied from 0.05 $\mu$m to 0.50 $\mu$m. It is seen from the nominal n values which correspond to the various $D_L$-$D_S$ combinations in consist Examples 23-28 that the lower (on the chart) value of n decreased with increase in size of $D_S$. This information is of value for controlling the yield stress properties of the coal-water slurry by providing a known range of $D_S$ which can be used to modify the properties.

As stated above, the data for Tables 1-3 was computed by fixing $D_S$ constant at 0.3 $\mu$m in the Alfred formula. It is to be understood that $D_S$ can be any $D_S$ in the range from 3 $\mu$m to 0.05 $\mu$m. Accordingly, comparable computer printouts of typical consists can be made where $D_S$ in the Alfred formula is held constant at any value between 0.05 $\mu$m and 3 $\mu$m. The data so derived can then be used to prepare an Alfred formula compact and an Alfred formula coal-water slurry having a consist in accordance with the corresponding Alfred formula consist.

Figure 12:
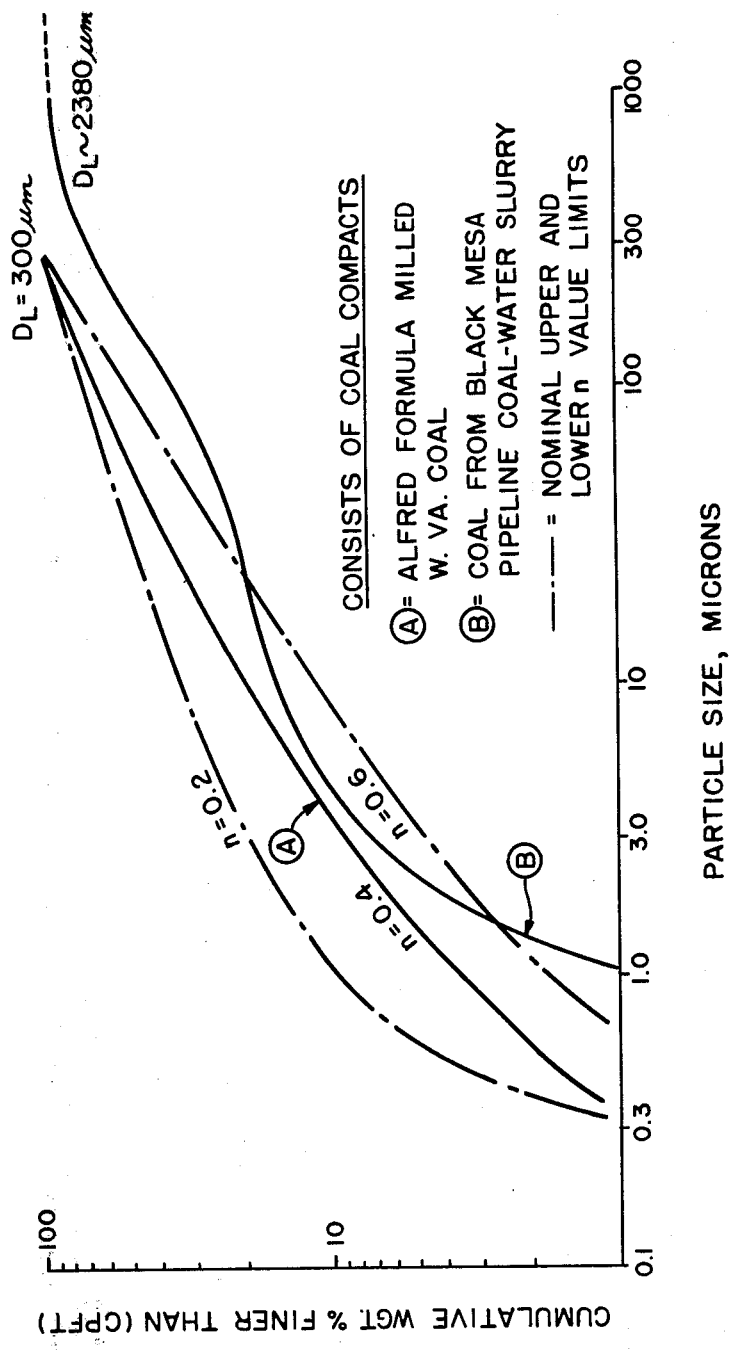
FIG. 12 is a chart showing correlations between consists by wgt. % and particle sizes in microns of a coal compact milled from West Virginia coal to an Alfred consist with $D_L = 300$ $\mu$m and $D_S < 1.0$ $\mu$m and a coal compact representative of Black Mesa coal-water slurry, and further illustrating nominal upper and lower n value limits for the Alfred consist.

Table 4 shows an analysis of the consist of FIG. 12 identified as Consist A, Alfred Formula West Virginia Coal Compact. Referring to FIG. 12, it is seen that the CPFT chart line for Consist A is well within the upper (n=0.2) and lower (n=0.6) parameter lines on the chart.

TABLE 1

TYPICAL CONSISTS OF 1180 $\mu$m × 0.3 $\mu$m COAL COMPACTS

| STATED PARTICLE $\mu$ SIZE IN $\mu$m | NOMINAL n VALUES WHERE CPFT IS AT LEAST 5 WGT. % WHEN $\mu$ IS <3 $\mu$m | | | |
|---|---|---|---|---|
| | 0.1 CPFT | 0.2 CPFT | 0.35 CPFT | 0.4 CPFT |
| .3 | .0 | .0 | .0 | .0 |
| .4 | 3.4 | 2.1 | .9 | .7 |
| .7 | 7.0 | 4.4 | 2.0 | 1.5 |
| 1.1 | 10.8 | 7.0 | 3.3 | 2.6 |
| 1.7 | 14.7 | 9.8 | 4.9 | 3.8 |
| 2.6 | 18.8 | 12.8 | 6.6 | 5.2 |
| 4.0 | 23.1 | 16.2 | 8.7 | 6.9 |
| 6.3 | 27.6 | 19.8 | 11.1 | 9.0 |
| 9.7 | 32.3 | 23.7 | 13.9 | 11.4 |
| 15.1 | 37.2 | 28.1 | 17.1 | 14.3 |
| 23.3 | 42.3 | 32.8 | 20.9 | 17.8 |
| 36.1 | 47.7 | 37.9 | 25.4 | 21.9 |
| 55.9 | 53.3 | 43.5 | 30.5 | 26.8 |
| 86.4 | 59.1 | 49.6 | 36.5 | 32.6 |
| 133.6 | 65.2 | 56.3 | 43.5 | 39.6 |
| 206.5 | 71.5 | 63.6 | 51.6 | 47.9 |
| 319.3 | 78.2 | 71.5 | 61.1 | 57.7 |
| 493.7 | 85.1 | 80.2 | 72.1 | 69.4 |
| 763.2 | 92.4 | 89.6 | 85.0 | 83.4 |
| 1179.9 | 99.9 | 99.9 | 99.9 | 99.9 |

TABLE 2

TYPICAL CONSISTS OF 300 μm × 0.3 μm COAL COMPACTS

| STATED PARTICLE μ, SIZE IN μm | NOMINAL n VALUES WHERE CPFT IS AT LEAST 5 WGT. % WHEN μ IS <3 μm | | | |
|---|---|---|---|---|
| | 0.2 CPFT | 0.3 CPFT | 0.5 CPFT | 0.6 CPFT |
| .3 | .0 | .0 | .0 | .0 |
| .4 | 2.5 | 1.6 | .6 | .3 |
| .6 | 5.2 | 3.5 | 1.4 | .8 |
| .8 | 8.1 | 5.5 | 2.3 | 1.4 |
| 1.2 | 11.3 | 7.8 | 3.4 | 2.2 |
| 1.8 | 14.7 | 10.4 | 4.8 | 3.1 |
| 2.6 | 18.3 | 13.3 | 6.4 | 4.3 |
| 3.8 | 22.2 | 16.5 | 8.3 | 5.8 |
| 5.4 | 26.4 | 20.0 | 10.7 | 7.6 |
| 7.9 | 30.9 | 24.0 | 13.5 | 9.8 |
| 11.3 | 35.8 | 28.4 | 16.8 | 12.6 |
| 16.3 | 41.0 | 33.4 | 20.8 | 16.1 |
| 23.5 | 46.7 | 38.9 | 25.6 | 20.4 |
| 33.8 | 52.7 | 45.0 | 31.4 | 25.8 |
| 48.7 | 59.2 | 51.9 | 38.3 | 32.5 |
| 70.0 | 66.2 | 59.5 | 46.6 | 40.8 |
| 100.7 | 73.8 | 68.0 | 56.5 | 51.2 |
| 144.9 | 81.9 | 77.5 | 68.5 | 64.0 |
| 208.5 | 90.6 | 88.1 | 82.8 | 80.0 |
| 299.9 | 99.9 | 99.9 | 99.9 | 99.9 |

TABLE 3

TYPICAL CONSISTS OF VARIOUS COAL COMPACTS

| CONSIST EXAMPLE NO. | U.S. SIEVE, MESH SIZE | STATED PARTICLE μ; SIZE IN μm | | NOMINAL CUM.WGT. % μ FINER THAN 3 μm | NOMINAL n LIMITS WHERE μ IS <3 μm WHEN CPFT IS AT LEAST 5 WGT. % | |
|---|---|---|---|---|---|---|
| | | $D_L$ | $D_S$ | | UPPER | LOWER |
| 1 | 16 | 1180 | 0.3 | 19.5 | 0.1 | — |
| 2 | 16 | 1180 | 0.3 | 5.7 | — | 0.4 |
| 3 | 20 | 850 | 0.3 | 20.0 | 0.1 | — |
| 4 | 20 | 850 | 0.3 | 5.2 | — | 0.45 |
| 5 | 30 | 600 | 0.3 | 18.0 | 0.15 | — |
| 6 | 30 | 600 | 0.3 | 5.0 | — | 0.5 |
| 7 | 40 | 425 | 0.3 | 17.7 | 0.2 | — |
| 8 | 40 | 425 | 0.3 | 5.8 | — | 0.5 |
| 9 | 50 | 300 | 0.3 | 20.5 | 0.2 | — |
| 10 | 50 | 300 | 0.3 | 5.0 | — | 0.6 |
| 11 | 70 | 212 | 0.3 | 20.9 | 0.2 | — |
| 12 | 70 | 212 | 0.3 | 5.0 | — | 0.65 |
| 13 | 100 | 150 | 0.3 | 25.3 | 0.2 | — |
| 14 | 100 | 150 | 0.3 | 6.1 | — | 0.65 |
| 15 | 140 | 106 | 0.3 | 26.4 | 0.2 | — |
| 16 | 140 | 106 | 0.3 | 5.7 | — | 0.8 |
| 17 | 200 | 75 | 0.3 | 29.3 | 0.2 | — |
| 18 | 200 | 75 | 0.3 | 6.6 | — | 0.8 |
| 19 | 270 | 53 | 0.3 | 32.4 | 0.2 | — |
| 20 | 270 | 53 | 0.3 | 7.7 | — | 0.9 |
| 21 | 400 | 38 | 0.3 | 35.7 | 0.2 | — |
| 22 | 400 | 38 | 0.3 | 7.0 | — | 1.0 |
| 23 | 50 | 300 | 0.05 | 5.0 | — | 0.635 |
| 24 | 50 | 300 | 0.10 | 5.0 | — | 0.625 |
| 25 | 50 | 300 | 0.20 | 5.0 | — | 0.607 |
| 26 | 50 | 300 | 0.30 | 5.0 | — | 0.590 |
| 27 | 50 | 300 | 0.40 | 5.0 | — | 0.574 |
| 28 | 50 | 300 | 0.50 | 5.0 | — | 0.557 |

TABLE 4

ANALYSIS OF CONSIST OF 300 μm × <0.52 μm WEST VIRGINIA COAL COMPACT

| STATED PARTICLE μ, SIZE IN μm | EXPONENT n VALUE = 0.4 CPFT |
|---|---|
| 0.52 | 1.8 |
| 0.6 | 2.0 |
| 0.8 | 2.8 |
| 1.0 | 3.5 |
| 1.5 | 5.2 |
| 3.0 | 9.0 |
| 5.0 | 13.0 |
| 10.0 | 20.0 |
| 20.0 | 30.0 |
| 30.0 | 38.0 |
| 50.0 | 48.0 |
| 70.0 | 56.0 |
| 100.0 | 65.0 |
| 200.0 | 88.0 |
| 300.0 | 99.9 |

When the Alfred formula consist is followed closely, as shown in FIG. 12 and Tables 1-4, for example, optimum practical particle packing with minimum void space volume is obtained for a coal-water slurry. By minimizing void spaces of a compact of coal particles it is obvious that a minimum amount of carrier water is needed to fill those voids. This in turn reduces the total amount of water needed for obtaining system fluidity.

For obtaining maximum fluidity in a prepared Alfred coal-water slurry, the consist of the Alfred formula compact used to make the slurry should follow the Alfred equation from $D_L$ to $D_S$ as closely as practically possible, and preferably, exactly, with n having a substantially constant value in the formula depicting the actual distribution size. Some fluctuations are found to commonly occur in bimodal blends and tend to decrease the packing efficiency. Such fluctuations will cause n values to fluctuate also. However, it is still possible to obtain pipeline pumpable slurries if the actual distribution is relatively close to that required by the Alfred formula for particular values of $D_L$ and $D_S$. It has been further found that rapid fluctuations in the values of n over the range of particle sizes from $D_L$ to $D_S$ are indicative of a non-uniform distribution of particle sizes in a compact in the range between $D_L$ and $D_S$.

It has been found that producing in a coal compact a total particle size spectrum described by the Alfred distribution formula will produce a low viscosity slurry in the presence of appropriate electrolyte and/or dispersing agent(s), and unless the size distribution is in accordance with the formula distribution those same agents will not produce a pipeline pumpable, low viscosity slurry.

For practice of this invention, it is important that the coal particles present in the coal compact and in the slurry be provided to have as close a particle size distribution as possible to the Alfred formula. In one method, this can be done by grinding coal under grinding conditions which can be carried out and controlled in a known way until the desired $D_L$, $D_S$ and Alfred particle size distribution in a desired n range for the coal compact is obtained. In a second method, a similar coal compact can be provided by blending several grinds of milled powders of coal to make a blend to obtain a similar Alfred particle size distribution in the compact as described by the above values, with a maximum solids content and with minimum void volume. Coal compacts prepared according to the Alfred formula can be used to prepare pipeline pumpable coal-water slurries having a minimum carrier water content and a low viscosity. For example, slurries of this invention have been produced having 77.5 wgt % of coal, dry basis, and a Brookfield viscosity at 60 rpm less than 2000 cps. (FIG. 1C). Similarly, by using a proper combination of steps (i), (ii), and (iii) as disclosed herein, slurries may be produced having 80 wgt % of coal, dry basis, and a Brookfield viscosity at 60 rpm less than 4000 cps (FIG. 1C) and be suitable for pumping in a long distance pipeline. In practicing the invention, it has been found that a large yield stress is required in the coal-water slurry when $D_L$ is large, e.g. 1180 μm, whereas a small yield stress is required when $D_L$ is small, e.g 100 μm. Also, if low viscosity pumping requirements are more important for a particular use condition than is storage stability, then a lower n Newtonian or pseudoplastic slurry to no yield stress can be produced.

The other two steps required for making the coal-water slurry hereof, i.e. the electrolyte enhancement of the bound water layer to control the water structure, and the dispersing of the coal particles and maintaining them at near maximum zeta potential, are both achieved by chemical treatments of the water present on and between coal particles in the coal-water slurry. Together with the Alfred consist compact, these elements determine the nature of the plasticity, i.e. the rheological properties, of the coal-water slurry. It has been found that efficient packing of coal particles in a compact according to the invention provides a minimum porosity, or free pore space, into which a minimum amount, compared to prior art amounts, of carrier water needs to be provided in order to have sufficient water present to obtain fluidity of the mass and to make it suitable for pipeline transportation. Presence of this minimum amount of carrier water, which may be as little as about 20 wgt. %, does not in itself render the mass fluid. However, by use of chemical treatment according to the invention in combination with the carrier water according to the invention, dispersion of the coal particles is achieved to separate the particles by repulsive charges in a known away in accordance with electrochemical principles. This step provides counterions which are believed to minimize the thickness of the bound water layer on a particle, and in effect affects its structure. Furthermore, it provides a zeta potential on the particles which helps maintain the closely packed particles in dispersed form.

More specifically, it has been found advantageous and beneficial in order to enhance the structure of the bound water layer and to control the zeta potential of a particle to take into account and, if necessary to modify, the type and amount of counterions present in the bound water layer present on the individual coal particles and in the carrier water present between coal particles. This is done by controlling the type and amount of electrolyte needed and used in the coal-water slurry.

The method steps used to provide the coal particles with a zeta potential controlled at near maximum zeta potential will depend in part upon the surface chemistry of the mined coal as it enters the slurry preparation plant, its treatment there in carrier water, and upon the chemistry, or electrolyte content, of the carrier water, and the water associated with the coal in the slurry. The chemistry of the water associated with the coal can vary from that of the moisture inherent in the coal as mined to that of the residue or primary wash water used at the mine mouth to that of the water used in preparing the slurry. In each case, different electrolyte solution ions may be present in the water, with each source providing different electrolyte content and affecting pH of these solutions and zeta potential of the particles.

When water is added to a powder comprising finely divided particles, and providing that the water "wets" the powder, a surface water film is adsorbed on each particle which is known to be structurally different from the surrounding "free" or bulk water, in that the film may be described as "semi-rigid", or bound water film. Depending on the fundamental electrical potential of the surface, this "semi-rigid" or bound water film may be of several molecules thickness. For example, on clays, the film has been estimated to about 80 Å thick. Although the subject is controversial due to present inability to accurately measure thise phenomena, both the thickness and the structure of the bound surface water film on the particle (hence its rigidity or non-mobility) can be influenced by both anionic and cationic additions to the system, depending on the polarity of the charge at the surface of the coal particle. It is well known that adding anions and cations to a dispersion of particles also changes the net residual electrical potential, or zeta potential, at the bound, or surface water film-free water interference. This zeta potential when maximized by counterions formed by ion exchange reactions between surface groups, such as acid groups and salt-like bonds on the surface of the coal particles and a counterion providing electrolyte deflocculates the particles, and when neutralized by other electrolytes allows flocculation of the particles by London-Vander Waals forces.

Coal, by its natural chemistry, may be expected to be hydrophobic (nonwetting), but due probably to its partial oxidation is sometimes hydrophilic. Consequently, for example, it has been found that coal from some mines, e.g. Black Mesa coal, can be deflocculated almost equally well using as the deflocculating agent either a water soluble anionic organic surfactant (Lomar D), believed to provide negative counterions, or a cationic alkali metal base, NaOH, providing positive counterions, or any combination of Lomar D and NaOH. West Virginia coal on the other hand requires the addition of the organic surfactant first to effect the surface water film adsorptivity, which then is deflocculated further by addition of the cationic NaOH.

Another phenomenon which is important is the oxidation state of the surface of the coal particles. Coal, as mined, may exist in various states of oxidation according to the amount and nature of salts dissolved in the bed water in the coal deposit, and the nature of the original flora which formed the precursor of the coal bed. Freshly ground coal is in a lower state of oxidation, compared with coal which has been ground and exposed to air. Therefore, it can be stated that the chemistry, including $O_2$, and structure of ground coal and its surface oxidation state will determine the type and exact combination of dispersing agents, such as surfactants, which maximize the effectiveness of deflocculation. Freshly ground coal has been found more advantageous for practicing the process of this invention than older ground coal. Further, different coals may not react the same, because of their chemical constitutions. Thus, some experimentation may be required to determine the optimum combination of oxidation state, fines content and deflocculating agents, required both as to type and amounts for a particular coal. Such experimentation is well within the skills of one working in the coal slurry art.

Accordingly, it is to be expected that coal may require a specific chemical treatment depending on the specific chemical environments in the coal bed from which it is mined. While need for chemical treatment at least of the free water by means of electrolytes and dispersing agents is found to exist, it is to be emphasized that usually the chemical agents used are not critical. However, some agents have been found more advantageous for use with certain coals than have others, and their use is preferred.

In practice of the invention it is preferred also that addition of any electrolytes and/or surfactants or other dispering agents be carried out as grinding mill additives during preparation of the coal compact, for two reasons, as follows.

First, the agents serve as grinding aids by maintaining a low slurry viscosity during grinding.

Second, they are immediately available for adsorption on the new surfaces generated during comminuation of the coal. Accordingly, need for later treatment with chemical ion species on the surfaces is minimized or eliminated and saves time, energy, and materials cost.

When the conditions have been satisfied for providing a compact with an Alfred particle size distribution wherein n is between 0.2 and 1.0, and for optimizing the zeta potential, more water is added, as needed to the blend to disperse the particles and produce a desired degree of plasticity or fluidity of the resulting Alfred formula coal-water slurry for transporting the slurry in a pipeline.

At this point two serious problems may arise, which could make the slurry useless for long distance pipeline pumping. These are:
a. the slurry may develop dilatent rheology; and
b. the slurry may be unstable and settle.

Present day coal slurry technology teaches that to overcome these problems, it is necessary to dilute the slurry to approximately 50 wgt % solids, which dilution separates the particles to minimize particle collision frequency sufficiently to overcome dilatency, and the to pump the slurry in the turbulent regime to avoid settling. It has been found that when the fluid transport velocity falls below the critical Reynolds number into the laminar flow regime, such slurry will exhibit instability and gradually settle out the larger particles. At the use site the prior art coal slurry is dewatered to bring the coal, as nearly as possible, back to its original state of dryness so that it can be burned. Such is the current technology of all commercial slurry pipeline systems, including that used in the largest coal pipeline in operation in the U.S. which runs from Black Mesa, Ariz., 273 miles to the Mohave Power Plant at Davis Dam, Nev.

According to the present invention, it has now been found that the above two problems are avoided provided that a sufficient amount, usually from 5 to 20 wgt %, dry basis, of the coal particles in the slurry are of colloidal size, usually particles of not more than 3 $\mu$m size, and further provided that especially the colloidal coal particles are in a deflocculated state. In the present invention, accordingly, preparation of a high solids content, e.g. 60–80 wgt %, slurry which is pumpable for long distances in a pipeline, depends first upon a proper preparation of the size distribution of coal particles in accordance with the Alfred consist formula from the coarsest particles down to colloidal particles of less than about 3 $\mu$m size and use of a critical amount of the such particles in the slurry.

It has been found also that to maximize solids content of a coal-water slurry while retaining yield pseudo-plastic rheology, all parts, including, broadly, a coarse fraction and a fine fraction, of the particle size distribution of a coal compact must be controlled to provide a substantially non-undulating particle size distribution.

In some cases, depending on the coal and its inherent properties, the desired $D_L$, $D_S$ and particle size distribution may be obtained directly by milling the coal, preferably in the presence of a predetermined amount of electrolyte and/or dispersing agent(s), until tests of the grind show that the desired sizes and distribution have been obtained. This is done, for example, as follows:

The particle size distribution or consist, of particles in a sample of the compact from a mill grind of coal particles having a desired $D_L$ is determined at grinding intervals for the whole range of particles, preferably in microns. A CPFT plot of log CPFT vs log of particle sizes in $\mu$m is then charted in a line plot on a log-log chart. The CPFT chart line then is compared to a selected Alfred formula CPFT chart line having n value preferably in the range of 0.2 to 0.7.

When the test results from the sample show that the desired particle size range and particle size distribution have been attained in accordance with the Alfred CPFT consist formula, the mill can be stopped and the coal compact used directly in preparation of the coal-water slurry by adding carrier water to a desired concentration.

In a coal compact made by this example, the value of n of the CPFT chart line for the mill ground coal compact optimally should be about 0.40 to provide a coal compact having a consist of 100% minus 300 $\mu$m (50) mesh having $D_S$ of about 0.3 $\mu$m and having about 11 wgt. % dry basis; of coal particles of minus 3 $\mu$m size. Use of such a mill grind coal compact will result in a nearly ideal, pipeline pumpable, coal-water slurry when further chemically treated if necessary, and mixed with carrier water in accordance with the present invention.

If a coarser pulverized coal can be used directly into a burner, e.g. 40% minus 600 μm (30 mesh), then the value n in the CPFT formula for the coal compact of the above example can be between 0.15 and 0.55, preferably 0.5, with $D_S = <1.0$, preferably about 0.5 μm. Milling then can be carried out to directly obtain a consist of 10 wgt. % particles minus 3 μm. A higher percentage of fines will improve the fluidity of the slurry, but it will also increase the costs of both milling and the dispersing agents required.

It was further found that the coarser the coarse end of the consist of a grind, the more fines are required to optimize fluid properties, and the finer its coarse end, the less fines are required. Stated another way, a "coarser" compact, e.g. all passing 16 mesh, requires a very wide particle size distribution, for example, ($D_L = 1180$, $D_S = <3.0$ μm, n=0.1 to 0.4). A "finer" compact, e.g. all passing 400 mesh, requires a narrower distribution, ($D_L = 40$ μm, $D_S = <1.0$ μm, n=0.2 to 1.0). Both of these coal compacts or "grinds" will yield consists with 10 wgt. % of particles of (−) 3 μm, but in the finer grinds the (−) 3 μm fraction may vary, and range from 7 to 36 wgt. % in the consist.

Pulverized coal (P.C.) as usually commercially ground may be found to form a coal compact with a particle size range which is close to a particular $D_L$ and $D_S$ desired for preparing a coal-water slurry of the invention. However, the coal particle size distribution of the P. C. may not have the sufficient amount of colloidal sized particles nor the substantially non-undulating particle size distribution of coal particles required for practice of this invention. In such case, it is necessary to further grind the pulverized coal until the sufficient amount of colloidal particles, i.e. at least 5 wgt. %, dry basis, are present, and a consist is obtained in accordance with the Alfred consist formula.

Also, it has been found that such a pulverized coal often can be blended as a coarse fraction with a fines fraction which has a large amount of minus 3 μm particles to prepare a coal compact provided that the blend approximates the Alfred distribution, having an Alfred formula consist. At least 5 wgt. % of all the particles in the resulting blend then should be of colloidal size, usually less than 3 μm in size (SEM). The total amount of fines of colloidal, or of minus 3 μm size, in the blend can range from about 5 to 20 wgt. %, dry basis, and preferably should be about 10 wgt. %. Adding too many fines to the P.C. fraction will increase the viscosity and will reduce the value n of the CPFT chart line of the Alfred formula.

Accordingly, if a given coal cannot be ground in a single milling operation to obtain a particle size distribution conforming to the Alfred CPFT formula chart line, with its n value preferably between 0.3 and 0.5, then a blend of two or more grinds with coarser and finer particle size distributions must be made, or otherwise provided, e.g. using Black Mesa slurry waste, to approximate the desired n value while also maintaining a minimum of 5 wgt % of colloidal particles in the final blend.

Also, in some cases when, due to a peculiarity of the grinding characteristics either of a particular coal and/or of a particular milling facility, an unduly undulating particle size distribution is obtained in the coal compact from the milling facility, steps can be taken to provide coarser or finer coal particles to smooth out the particle size distribution at the undulating part or parts of the distribution.

Figure 8:
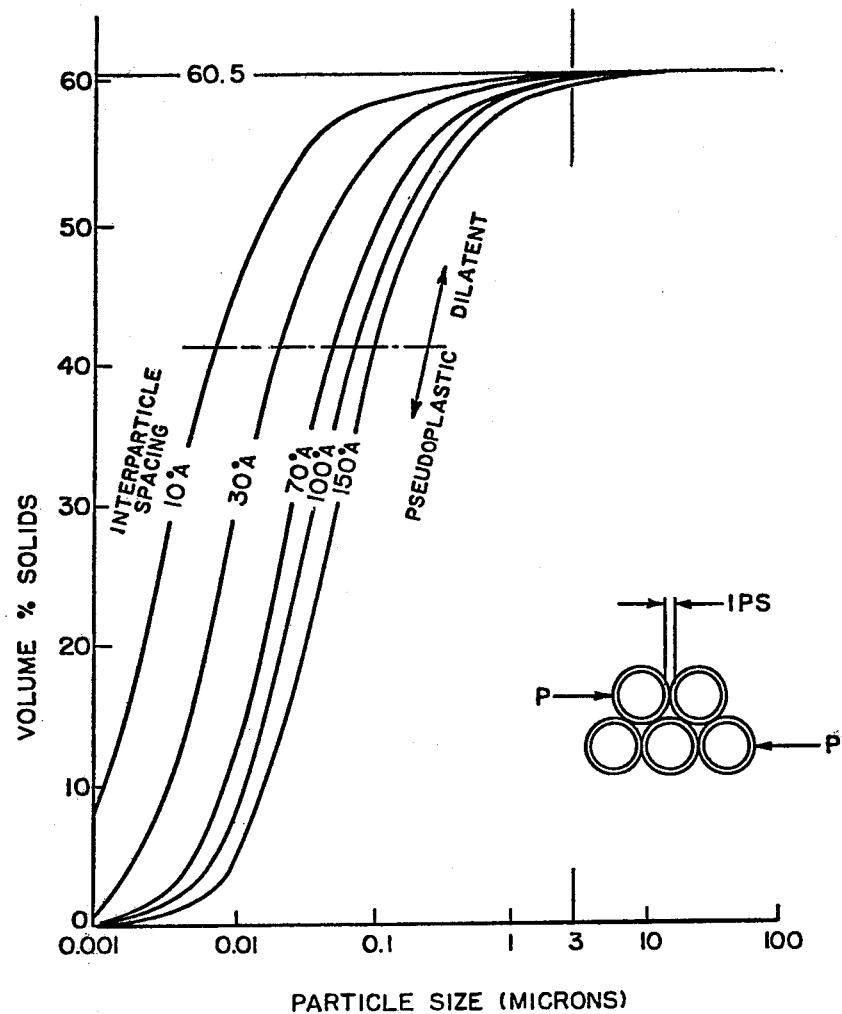
FIG. 8 is a chart illustrating effect on solids content of monospheres of solids as adsorbed bound water layer film thickness is increased and showing the significance and importance of the minus 3 $\mu$m particle fraction in the Alfred formula consist of a coal compact and its effect on the yield pseudoplastic properties of the coal-water slurry in which the coal compact is present.
Figure 9:
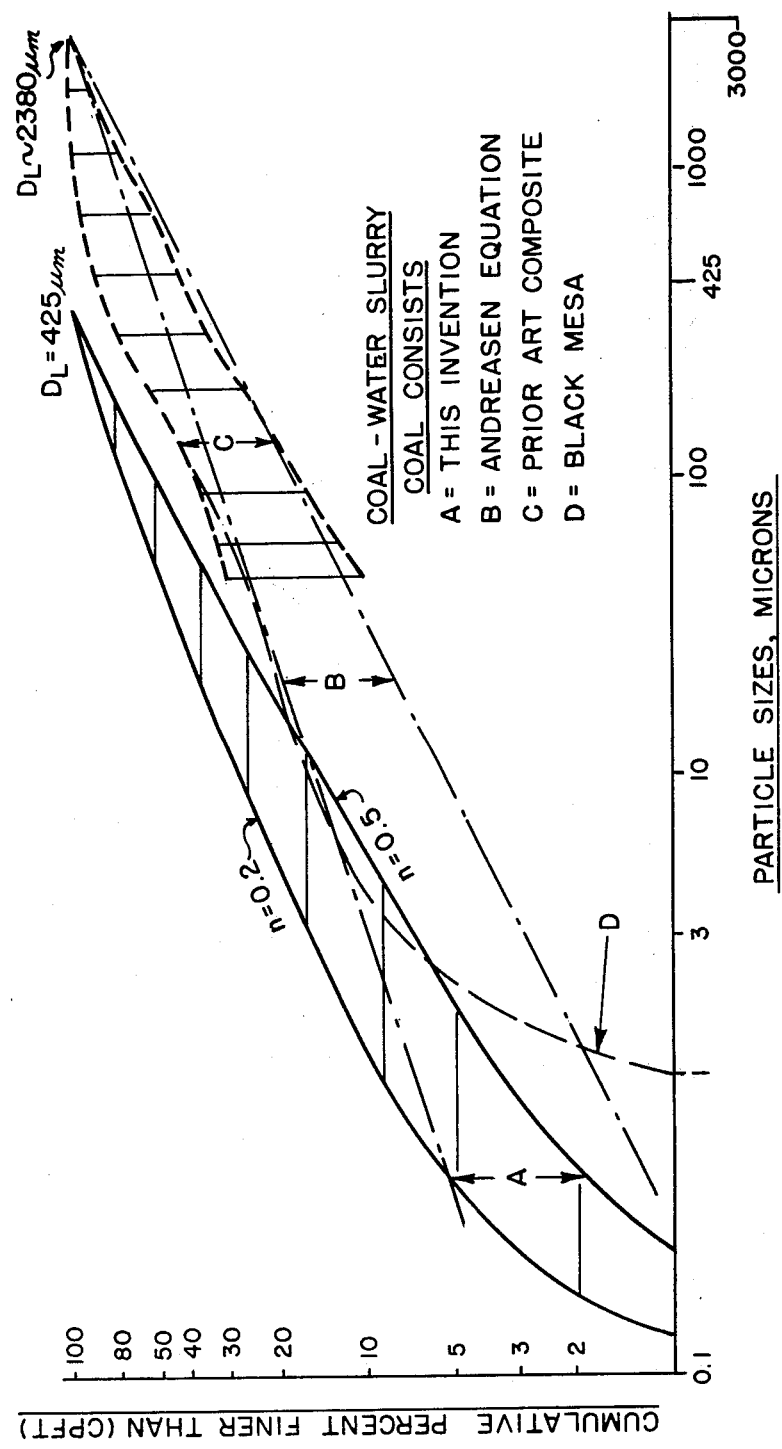
FIG. 9 is a chart showing correlations between particle size distributions (consists) by wgt. % and particle sizes in microns of: (A) typical Alfred formula coal compacts of this invention: (B) coal compacts having a theoretical Andreasen distribution, (C) a composite of coal compacts as determined from descriptions of coal-water slurries in prior art patents; and (D) a coal compact used in Black Mesa coal-water slurry, as described by Dina in the literature.
Figure 10:
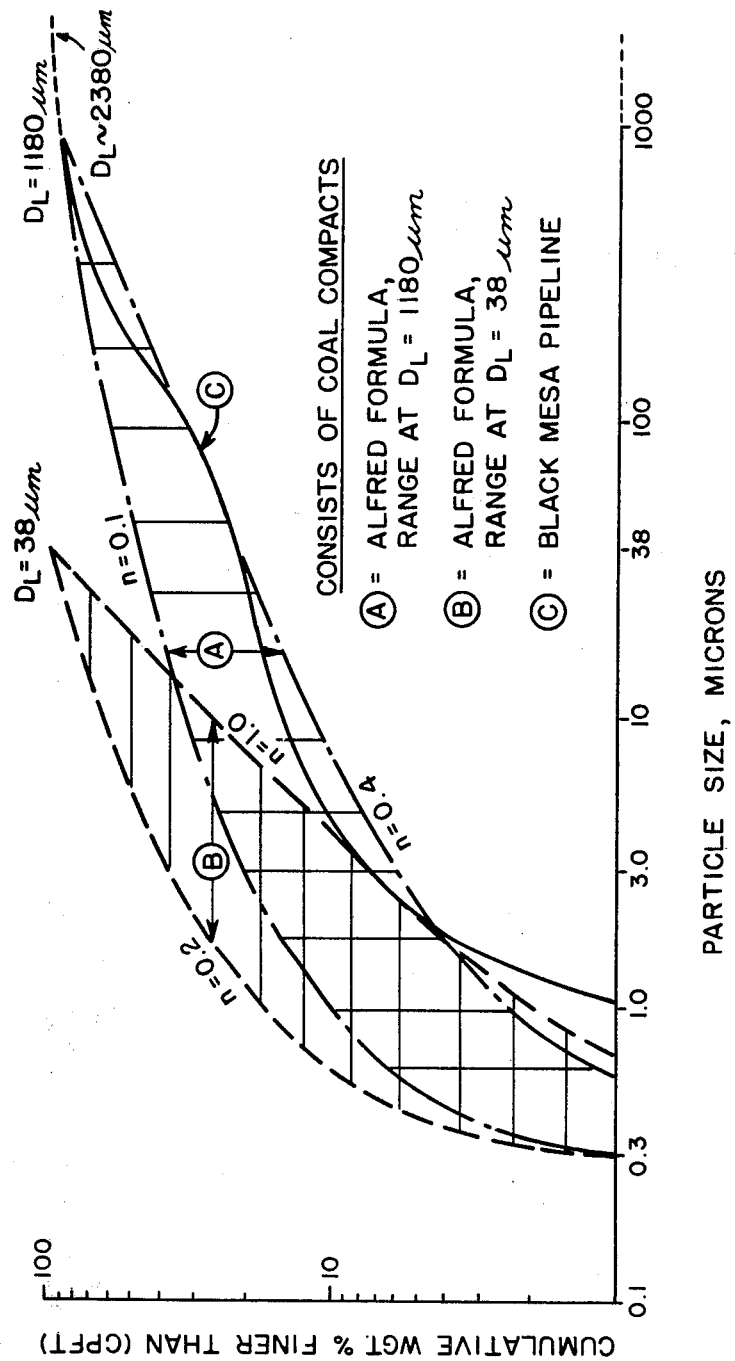
FIG. 10 is a chart showing correlations between particle size distributions (consists) by wgt. % and particle sizes in microns of ranges of coal compacts made according to the Alfred Consist formula at $D_L = 1180$ $\mu$m and at $D_L = 38$ $\mu$m with $DS < 3$ $\mu$m in each consist, and further compared with a chart line plot of a coal compact representative of a commercial Black Mesa coal-water slurry.

The significance of the colloidal, usually (−) 3 μm size, fraction with regard to pseudoplasticity and dilatency of a slurry is illustrated in FIG. 8 of the drawing. One must consider that monospheres typically pack in an average orthorhombic array at 60.51 volume % solids regardless of size with the particles touching each other.

If a film of semi-rigid water is adsorbed on each particle, then one must consider that the volume percent solids is reduced by moving the particles away from each other by twice the water film thickness (inter-particle spacing, or IPS). As shown in FIG. 8, for particles of size below 3 μm, the adsorbed water film becomes a significant part of the packing volume. FIG. 8 inset further shows that if the interparticle spacing of particles P is equal to or greater than $(2-\sqrt{3})$ times the particle diameter, then this system can be sheared by merely distorting the rigid water films and not causing particle collisions. This condition would at least avoid dilatency and probably induce yield pseudoplasticity. Therefore, improving the "strength" of the rigid water films of the system by adding advantageous counterions in accordance with above step (ii) of the method of the invention should tend toward true plastic rheology with a yield stress.

The above theory is, of course, distorted by the fact that pulverized coal particles are neither mono nor spheres, and one must work with an actual size distribution of rough, variously shaped particles. Also, there is no simple way of determining precisely how much material is less than 3 μm in size. However, methods, such as electron microscope measuring techniques, as defined, can be used to make such determinations. In any case, the above concept and step (ii) of ensuring that an adequate amount of advantageous counterions are present in the bound water layer are helpful for obtaining a stable, high solids content slurry having low viscosity and suitable for pumping in a long distance pipeline.

The effect that the presence of a dispersing agent, such as a surfactant, has upon the coal-water slurry to increase its rheological plasticity has also to do with the structure of the bound water film on the colloidal particles in the slurry. Although the dispersing agent affects every particle present, the effect is most important when there are sufficient colloidal sized, i.e. minus 3 μm, particles, present, because the agent influences the particle-particle interactions.

A dispersing agent in a coal-water slurry according to the invention is believed to perform at least three functions, as follows. First, a water soluble dispersing agent which also serves as a wetting agent, such as an organic surfactant, functions and may be necessary and may be used to promote wettability of the coal particles by water. Such an agent may or may not be needed, depending upon the surface chemistry of the coal and the associated electrochemistry of its bound water layers. For example, inherent bed moisture and chemical compounds already present in natural coal deposits may also allow wetting of the ground coal by added water, as discussed above.

Second, a dispersing agent, such as a water soluble surfactant, whether organic or inorganic, functions and may be necessary to promote deflocculation of colloidal and larger sized coal particles in the presence of advantageous electrolytes. According to the DLVO theory (Dejaguim, Landau, Verwey, Overbeek), small monovalent cations such as $Na^+$ or $K^+$ in proper concentrations will maximize the negative zeta potential of particles, thereby allowing the particles to repulse each other and to slide past one another without bonding. This is the classical concept of deflocculation. Larger, higher valence, cations, such as $Ca^{+2}$, $Al^{+2}$, and $Mg^{+3}$, will tend to reduce the particle charge to zero, allowing flocculation of particles by Vander Waal's forces. Further additions of larger cations can change the polarity of the zeta potential and again increase it. Thus, it is possible for deflocculation to occur at both a negative potential, or at a positive potential. A residual $Na^+$ or $K^+$ on an organic anionic surfactant which causes wetting therefore, can be a very effective deflocculant.

For practice of the invention, it has been found that a zeta potential at a maximum attainable millivoltage for a particular coal compact in a particular carrier water is undesirable at high solids content, particularly in the range above about 60 wgt. %, for the reason that the yield pseudoplastic rheology of the coal-water slurry may be shifted into a dilatent rheology and become too viscous to be pipeline pumpable. Therefore, zeta potential must be maintained at a near maximum zeta potential as ascertained by millivoltage values obtained relative to maximum attainable millivoltage, substantially as described in the Examples.

Third, the dispersing agent functions in some cases as an electrolyte and is necessary for enhancing pumpability of the coal-water slurry by enhancement or inhibition of the structure of the bound or, semi-rigid water layer. It does this by providing a cation as a counterion for the bound water layer which will affect the yield pseudoplastic index (slope of a plot of log viscosity vs log shear rate) of the mass. Preferably, the cation provided by the agent is $NH_4^+$, $Na^+$ or $K^+$. A counterion, such as $Na^+$, is a structure breaker, whereas a counterion cation, such as $Ca^{+2}$, is a structure maker. Therefore, the former are preferably used. The structure making or structure breaking tendencies of each of these counterions is determined by their $z/a^2$ (valence/ion radius) relationship which increases and decreases entropy, respectively. For further discussion of this principle, see W. G. Lawrence, Chapter in *Clay Water Systems,* W. G. Lawrence, ed. N.Y.S. College of Ceramics, Alfred, N.Y. (1965). The phenomenon is believed analogous to lowering the melting point of glass by adding alkali to the glass composition. Therefore, by using the DLVO theory in practice of the invention, it has been found that addition of a sufficient amount of an advantageous electrolyte, such as an ammonium or alkali metal base, to a coal-water slurry has been found effective to increase deflocculation of the slurry and thereby to improve its yield pseudoplasticity, whereas addition of an alkaline earth metal base has been found to be less or completely ineffective.

The above steps (i), (ii), and (iii) and the related conditions are taken into consideration for the practice of this invention in order to obtain a stable yield pseudoplastic, high solids content, low viscosity slurry. For example, 1. The consist, or particle size distribution, of coal particles of a coal compact to be used to make the coal-water slurry of the invention must be in accordance with the Alfred consist formula.

$$CPFT = \left[ \frac{D_\mu{}^n - D_S{}^n}{D_L{}^n - D_S{}^n} \right] \cdot 100,$$

as defined above, and as may be represented in a linear plot thereof on a log-log chart and have n value in a range determined from $D_L$ and $D_S$, substantially as illustrated in FIG. 12 and Tables 1–4. When at least 10 wgt. % of the particles are $(-)$ 3 $\mu$m, pulverized coal (P.C.) at 50 to 70 wgt. % minus 200 mesh $(-75$ $\mu$m) can be used to make coal compact to be used in making coal-water slurry by adding additional fines to the P.C. to raise the total fraction of $(-)$ 3 $\mu$m particles present in the P.C. grind to at least 5 wgt. %, and the total distribution to that according to the Alfred consist formula. Any such bimodal blends usually may advantageously be used. Rod milled commercial P.C. coal usually will not contain sufficient fines, and therefore, blending of ball milled fines with such grind of coal may be necessary to obtain a consist in accordance with the Alfred formula.

2. The minus 3 $\mu$m fraction is a colloidal fraction and should be between 5 and 20 wgt. %, dry basis, of total particle weight of the coal, with at least 10 wgt. %, preferably 10 to 20 wgt. %, the most desirable.

3. Either the coal must be naturally wetted by its natural surface oxidation or other chemical state, or water soluble surfactants, such as the electrolytes and/or dispersing agent(s) discussed herein, must be added to effect wetting. Between 0.05 and 2 wgt % of organic or inorganic surfactants of wetting agent capability based on total weight of coal may be necessary, or both types of surfactants may be necessary together, in an amount totaling up to 4 wgt. %, dry basis.

4. The repulsive electrical zeta potential of the colloidal coal particles must be raised to a millivoltage just short of maximum, as discussed above, by addition of an effective amount of zeta potential enhancing dispersing agent to obtain yield stress needed to retain yield pseudoplasticity. The polarity of the zeta potential may be either positive or negative depending on the ions present in the coal particle surface, and in the bound water layer, but usually, and preferably, will be negative.

The kind of water used as carrier water may be any available water, such as mine, well, river, or lake water or desalinated ocean water having a sufficiently low mineral salt content such that the electrochemistry of the bound water layer and carrier water interface can be controlled in accordance with the invention and corrosion of milling facilities, pipelines and furnaces will be minimized and controllable.

The kind of coal used for practice of the invention is not critical. Coals found in the United States, particularly low volatile bituminous coals, from West Virginia, Kentucky, Ohio, Arizona or Montana fields, have been used. However, anthracite, semi-anthracite, medium and high-volatile bituminous, sub-bituminous and lignite coals all may advantageously be used to practice the invention.

The coal used to prepare the coal-water slurry can be obtained in finely-divided form by cleaning and pulverizing larger sized coal to the desired particle sizes. The coal content of the pulverized coal can be enriched by use of known clay and mineral separation processes to obtain a coal of low ash content, e.g. under 5 wgt. %.

However, the ash content of the coal may be higher or lower than 5 wgt. %, e.g. from 0% to 20 wgt. % while permitting the benefits of the invention to be obtained.

The coal for use in the process can be obtained in a dry or wet form and mixed with water to form a coal-water slurry. Preferably, the coal for making a fine particle sized fraction is wet milled in known ways to prevent dust and explosion hazards, while adding electrolyte and/or dispersing agent(s) to the water in accordance with this invention. The wet milled coal fraction can be milled with all the water or it can be mixed with sufficient additional water to make a slurry which will be readily pumpable in a pipeline, when it further is mixed with a coarser particle sized pulverized coal fraction to form a yield pseudoplastic coal-water slurry according to the invention. Usually, the water content of the final coal-water slurry product will be in the range of about 20% to 55% by weight of slurry. Preferably, the water content will be from 20% to 45% by weight. The total amount of water must, however, be at least that needed to transport the Alfred coal-water slurry in a pipeline to its destination if the slurry is to be transported in a pipeline. Bulk shipments of the Alfred coal-water slurry can also be made. Further, the Alfred coal compact can be compressed to make a high density coal mass with minimum fluid content particularly in areas where water is scarce and pipeline transport is not feasible.

In carrying out the invention, much work has been expended grinding and blending coals from different fields. As a result of this work it has been found that West Virginia bituminous coal grinds very easily to a particle size distribution in accordance with the Alfred CPFT formula. This ground coal then can be deflocculated using 0.1% Lomar D and NaOH as an electrolyte-dispersing agent combination.

Black Mesa coal is a western United States sub-bituminous type coal from Arizona deposits having a dry specific gravity of 1.45 and a equilibrium moisture of about 11 percent. Its ash content is about 10 percent. The consist of coal of typical Black Mesa pipeline coal-water slurry is essentially all minus 14 mesh (1400 $\mu$m)$\times$18 to 20% passing 325 mesh ($-44$ $\mu$m). Solids concentration of the Black Mesa slurry averages 48 percent by weight of the above coal.

While it has been found that Black Mesa coal is considerably more difficult to grind than is West Virginia coal, it has also been found that when a coal compact is prepared from the Black Mesa coal to have a consist according to the Alfred consist formula, much less electrolyte and/or dispersing agent(s) is required to provide yield pseudoplastic fluidity.

The dispersing agents used in preparing the Alfred formula coal-water slurry can be any synthetic or natural materials having wetting agent properties and which will maximize the zeta potential of the coal particles to near maximum zeta potential as herein described. For reaons discussed above, the dispersing agent effective for use for a particular coal will be selected on the basis of the surface chemistry of the coal particles. Accordingly, the dispersing agent, preferably a surfactant, will usually be a surfactant which in some cases will be an anionic surfactant, in other cases a cationic surfactant, and in some cases even a nonionic surfactant. Thus, preferred dispersing agent can be an organic or inorganic material. Preferably the material is an anionic surfactant when the coal is a bituminous coal from a West Virginia, Kentucky, Ohio, or other Appalachian area coal field, and when the coal is a bituminous or sub-bituminous coal from an Arizona or other Western area coal field.

Examples of anionic organic surfactants which have been found particularly advantageous for providing yield pseudoplastic rheological properties to Alfred formula coal-water slurries, particularly those containing about 60 to 80 weight % of West Virginia or Black Mesa, Ariz. coal, are shown in Table 5. In some cases, mixtures of two or more of these surfactants beneficially can be used.

Most preferably the deflocculating agent is selected from the group of anionic organic surfactants consisting of:
(i) 2-ethylhexyl polyphosphoric ester acid anhydride and its potassium salt,
(ii) complex organic polyphosphoric ester acid anhydride and its potassium salt,
(iii) condensed mononaphthalene sulfonic acid and its sodium and ammonium salts, and
(iv) mixtures thereof.

TABLE 5

| Anionic Organic Surfactant | Tradename | Form | % conc. |
|---|---|---|---|
| 2-ethylhexyl polyphosphoric ester acid anhydride | Strodex MO-100 | Liquid | 100 |
| Potassium Salt of MO-100 | Strodex MOK-70 | Paste | 70 |
| Complex organic polyphosphoric ester acid anhydride | Strodex MR-100 | Liquid | 100 |
| Complex organic polyphosphoric ester acid anhydride | Strodex SE-100 | Liquid | 100 |
| Complex organic polyphosphoric ester acid anhyride | Strodex P-100 | Liquid | 100 |
| Complex organic polyphosphoric ester acid anhydride | Strodex PK-90 | Liquid | 90 |
| Potassium salt of complex organic polyacid anhydride | Strodex MRK-98 | Liquid | 98 |
| Potassium salt of complex organic polyacid anhydride | Strodex SEK-50 | Liquid | 50 |
| Potassium salt of complex organic polyacid anhydride | Strodex PSK-58 | Liquid | 58 |
| Potassium salt of complex organic polyacid anhydride | Strodex V-8 | Liquid | 85 |
| Sodium salt of an alkyl mono naphthalene sulfonic acid | Lomar D Lomar NCO Lomar PW | Powder | 86– 90 |
| Sodium salt of an alkyl mono naphthalene sulfonic acid | Lomar LS | Powder | 95 |
| Ammonia salt of an alkyl mono naphthalene sulfonic acid | Lomar PWA | Powder | 89 |
| Solution of sodium salt of an alkyl mono naphthalene sulfonic acid | Lomar PL | Liquid | 45 |

Strodex is a trademark of Dexter Chemical Corporation.

Lomar is a trademark of Diamond Shamrock Process Chemicals, Inc.

Other suitable anionic organic surfactants can be selected for screening from those listed in McCutcheon's *Detergents & Emulsifiers* North American, 1976 annual edition, McCutcheon Division, MC Publishing Co., Ridgewood, N.J. 07451 and in *Encyclopedia of Surface-Active Agents*, J. P. Sisley, Chemical Publishing Company, Inc., New York (1964, Vol. II). Those found to be effective in the environment of a particular coal and its carrier water can then be used for preparing Alfred formula coal-water slurry.

While the use of the sodium and ammonium salts of condensed mononaphthalene sulfonic acid are preferably used, it is to be understood that the condensed mononaphthalene sulfonic acid can be used with the addition of sodium or ammonium alkali to form the correponding sodium or ammonium salt of that acid in situ.

In contrast to the tested and selected anionic organic surfactants useful in the practice of the invention, many organic and inorganic compounds were tested and found unsuitable as effective deflocculants for forming a pipeline pumpable rheologically plastic coal-water slurry, as disclosed in copending application Ser. No. 957,166, filed Nov. 2, 1978, which disclosure is incorporated herein by reference.

Referring specifically to the electrolytes useful in practice of the invention, some alkali metal inorganic compounds were found effective as electrolytes to enhance the dispersing activity of the screened and selected anionic organic surfactants in the presence of West Virginia and Arizona coals. Alkali metal carbonate, hydroxide or silicate of sodium or potassium are particularly effective. Preferably, the inorganic compound is at least one of $K_2CO_3$, $NaOH$, and $Na_2SiO_3.9H_2O$. In the case of Arizona coal, an alkali metal hydroxide, carbonate, or silicate may be used even in the absence of an organic surfactant to adequately deflocculate the coal-water slurry containing at least 5% of minus 4 $\mu$m particles. The reason for this way may be that the Arizona coal is already effectively wetted by natural surfactants, and addition of the inorganic compound serves to activate and enhance the dispersing effect of the natural material. When used in the presence of a synthetic surfactant, the alkali material preferably is added before the anionic organic surfactant is added to the slurry, but this order is not essential. Mixtures of the above alkali materials also can be used. It is to be understood that the combination of electrolyte and dispersing agent is used to bring the zeta potential of the coal particles to near maximum zeta potential in accordance with the invention as discussed above, and to disperse the coal particles, especially those of colloidal size.

The amount of dispersing agents used can be determined by routine experiments to screen and select agents effective for a particular Alfred formula consist of coal and carrier water to convert it to a pipeline pumpable coal-water slurry having the coal particles at near maximum zeta potential. The amount will vary, depending upon such factors as the concentration of the coal in the slurry, the particle size and particle size distribution, the amount of ash, i.e. clays and other minerals present, the temperature of the slurry, the pH, the original zeta potential of the particles, and the particular electrolyte and/or dispersing agent(s), e.g. a deflocculant anionic organic surfactant, and its concentration. In general, the dispersing agent, e.g. the above deflocculant, is present in the slurry at from 0.1 to 0.7 weight percent based on the weight of dry coal. Procedurally, in determining the amount of a specific dispersing agent needed, a series of measurements are made of viscosities versus shear rates versus zeta potential as described in Ex. 1 for a series of coal-water slurries containing a range of amounts of a particular dispersing agent for a constant amount of coal-water slurry. The data can be plotted as shown in FIGS. 2–5 and 13 and used as a guide to the optimum quantities of that agent to use to obtain near maximum zeta potential. The coordinate of the chart at which the viscosity and/or zeta potential is not decreased significantly by adding more agent is selected as an indication of the optimum quantity at maximum zeta potential, and the amount is read from the base line of the chart. The viscosity and amount read from the titration chart (FIGS. 2–5 and 13) is then compared with an equivalent chart showing a correlation among viscosity, amounts and maximum zeta potential (FIG. 2). An amount of electrolyte and/or dispersing agent(s) required to provide a near maximum zeta potential and a selected viscosity is then used to make the Alfred coal-water slurry. For example, in FIG. 2 near maximum zeta potential of (−) 50 to (−) 63.2 mv were obtained with 0.4 to 0.5 wgt. % of dispersing agent in a 55 wgt. % Alfred coal-water slurry.

Other methods for selecting the type and amount of dispersing agent needed to obtain a near maximum zeta potential in a coal consist made according to this invention will be apparent to those skilled in the coat-water slurry art.

Figure 3:
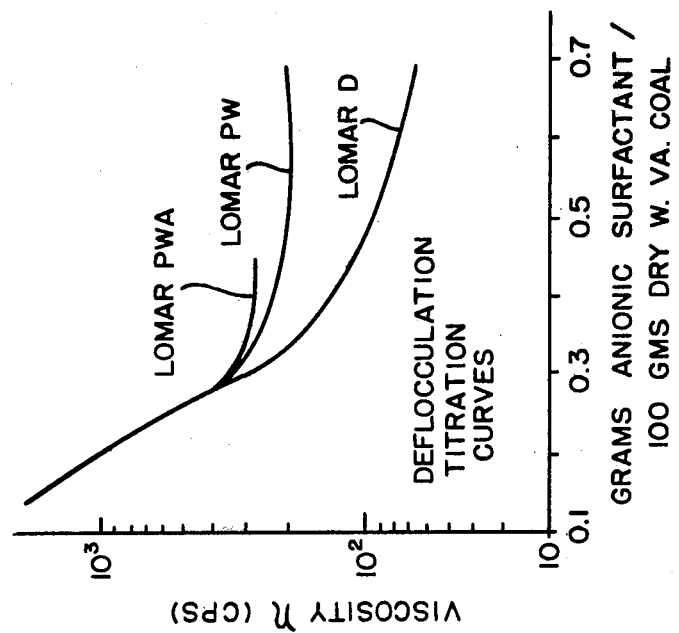
FIGS. 3, 4 and 5 are charts showing titration curves and illustrating corelations between Brookfield viscosities and amounts of electrolyte and/or dispersing agent(s) used in determining optimum amounts of agent(s) to be used to obtain lowest viscosities.

FIG. 3 shows semi-logarithmic plots of deflocculation curves obtained with varying amounts of sodium salt of condensed mono maphthalene sulfonic acid (Lomar PWA and Lomar PW) and of the ammonia salt of said sulfonic acid (Lomar D) dispersed in carrier water in parts of surfactant per 100 parts of ball milled W. Virginia coal (dry basis, 100 wgt. % 325 mesh ((−) 45 $\mu$m) and having 10 wgt. % of particles minus 3 $\mu$m) in a coal-water-anionic organic surfactant slurry containing 55 wgt. % of coal. From this data it is concluded that rheological plasticity will be provided and retained at near maximum zeta potential when about 0.4 to 0.7 gm of the anionic surfactant is present per 100 gms of dry W. Virginia coal in a dispersed coal-water slurry containing 55 wgt. % of coal with the particle size distribution according to the Alfred formula.

Figure 4:
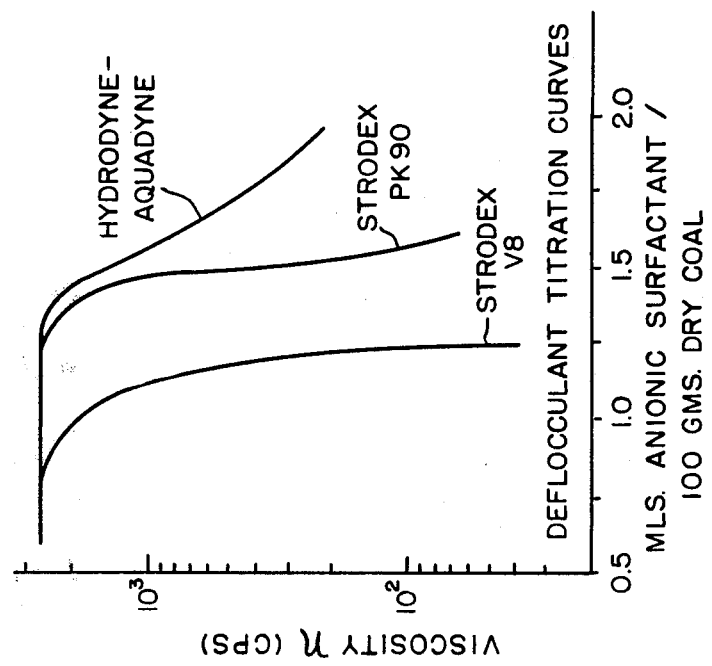

FIG. 4 similarly shows semi-logarithmic plots of deflocculation curves obtained with varying amounts of potassium salt of complex organic polyphosphate ester acid anhydride (Strodex V8 and Strodex PK-90) and of Hydrodyne-Aquadyne, a mixture of non-ionic wetting agents, dispersed in water in ml. of surfactant per 100 parts of ball milled West Virginia coal (dry basis, 100 wgt. % minus 325 mesh ((−) 45 $\mu$m), 10 wgt. % minus 3 $\mu$m) in a coal-water-anionic organic surfactant slurry containing 55 wgt. % of West Virginia coal slurry. From this data it is concluded that rheological plasticity will be provided and retained when about 1 to 2 mls of liquid anionic surfactant or of non-ionic wetting agents are present per 100 gms of dry coal in a dispersed coal slurry containing 55 wgt. % of coal with the particle size distribution according to the Alfred formula.

Quantities of other dispersing agents to use can be determined similarly. In general, the flow behavior of the slurry is controlled below the solids content or the dispersing agent addition level at which dilatency could begin to occur i.e. below the level at which viscosity increases as shear rate increases. Pumpability of the coal-water slurry is optimum under such rheological conditions but would decrease rapidly as dilatency is approached.

As discussed above, certain electrolytes, such as alkali inorganic compounds, can be added to the slurry to enhance the rheological plasticity of the slurry in the presence of an anionic organic surfactant. The effects of the addition of NaOH to 55% coal-water slurry wherein the coal particles were 100 wgt. % minus 325 mesh and 10 wgt. % minus 3 μm and containing varying amounts of an anionic organic surfactant, Lomar D, are shown in Table 6.

TABLE 6

| NaOH, gms | Lomar D | Brookfield Viscosity, cps at 60 rpm |
|---|---|---|
| 0.4 | 1.15 | 450 |
| 1.2 | 0.75 | 175 |
| 2.0 | 0.80 | 450 |

Table 6 shows a ratio of NaOH to Lomar D of 1.2:0.75 to provide an optimum low Brookfield viscosity of 176 cps at 60 rpm. From this data it is concluded that rheological plasticity will be provided and retained when the above ratio of amounts of NaOH to Lomar D are used to prepare an Alfred formula coal-water slurry.

Figure 5:
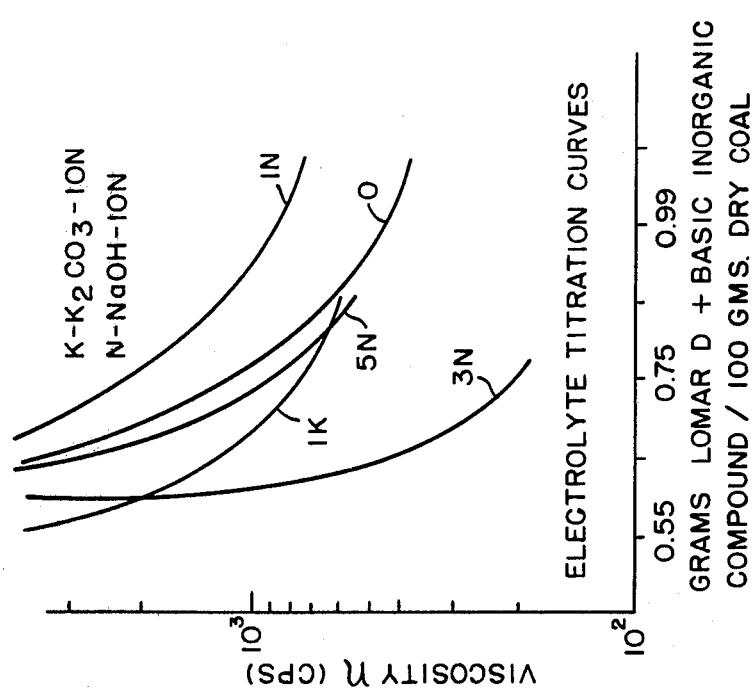

FIG. 5 shows deflocculation curves obtained using West Virginia bituminous coal-water slurry (wherein the coal particles were ball milled to provide 100 wgt. % minus 325 mesh and 10 wgt. % minus 3 μm), 67.4 wgt. % solids, deflocculated with from about 0.75 to 1.05 gms of Lomar D per 100 parts of coal (dry basis) and varying amounts of NaOH and $K_2CO_3$. The alkali materials were prepared as 10 N solutions in water and added in various amounts by volume to the slurry. In FIG. 5, 0=0 ml; 1 N=1 ml of 10 N-NaOH; 3 N=3 ml 10 N-NaOH; 5 N=5 ml 10 N-NaOH; and 1 K=1 ml 10 N-$K_2CO_3$. It is concluded from the deflocculation curves that the use of 3 ml of 10 N-NaOH should provide optimum low viscosity at about 0.75 gm of Lomar D per 100 gms of coal in Alfred formula coal-water slurry. As each ml of 10 N-NaOH equals 0.4 gm of NaOH, dry basis, and each ml of 10 N-$K_2CO_3$ equals 0.69 gm of $K_2CO_3$, the amount of alkali present in the slurries from which the data shown in the curves was obtained ranged from 0.4 to 2.0 gm per 100 gm of coal.

EXAMPLE 1—PROCEDURE FOR SCREENING AND SELECTING DISPERSING AGENTS FOR USE IN MAKING ALFRED FORMULA COAL WATER SLURRY.

A surfactant or combination of surfactants effective for use in practicing the invention may be found by either of the two following methods (a) or (b) as applied in (c).

(a) Zeta potential measurement

In general, a sample of coal is ground in a laboratory size porcelain ball mill with porcelain balls in water at 30 wgt. % solids for approximately 24 hours to insure that all the particles are <10 μm. Small samples of this larger sample are then prepared in a known way by placing them in a vessel equipped with a stirrer with a sample of water to be used as a carrier in the Alfred formula coal-water slurry. Various acidic and basic salts are then added in incremental amounts to vary the ph, and various concentrations of various candidate dispersing agent organic surfactants likewise are added in incremental amounts (e.g. grams per gram coal, both dry basis), alone or in combinations of two or more. These samples are then evaluated in any electrophoretic mobility, electrosomosis, or streaming potential apparatus to measure electrical potentials, from which the zeta potential is calculated in a known way. Plots of zeta potential vs. pH vs. concentration may then be made to indicate candidate surfactants, or combinations thereof to be used to produce the optimum dispersion of coal particles in the carrier water below the amount at which dilatency may be reached. A Pen Kem System 3000 apparatus was used in the determination described and can process 40 samples in about 6 hours.

Alternate method for estimating equivalent zeta potential

A large sample of coal is ground in water as described in (a) above at 50 wgt. % solids for about 2 to 4 hours to produce a slurry. This slurry is found to have a Brookfield viscosity at 30 rpm of about 10,000 cps.

Smaller samples, about 500 ml, of this slurry are then deflocculated by adding various candidate dispersing agent surfactants and surfactant combinations to the sample of slurry, as above, dry or, preferably, in solution, dropwise, blending gently, and then measuring the viscosity at some constant shear rate (e.g., using a Brookfield LVT viscometer at 30 rpm). A surfactant system which is found to produce an acceptably low, preferably the lowest, viscosity at the lowest amount, e.g. in wgt. % of addition on a dry coal basis is thereby identified as the most effective surfactant.

Figure 13:
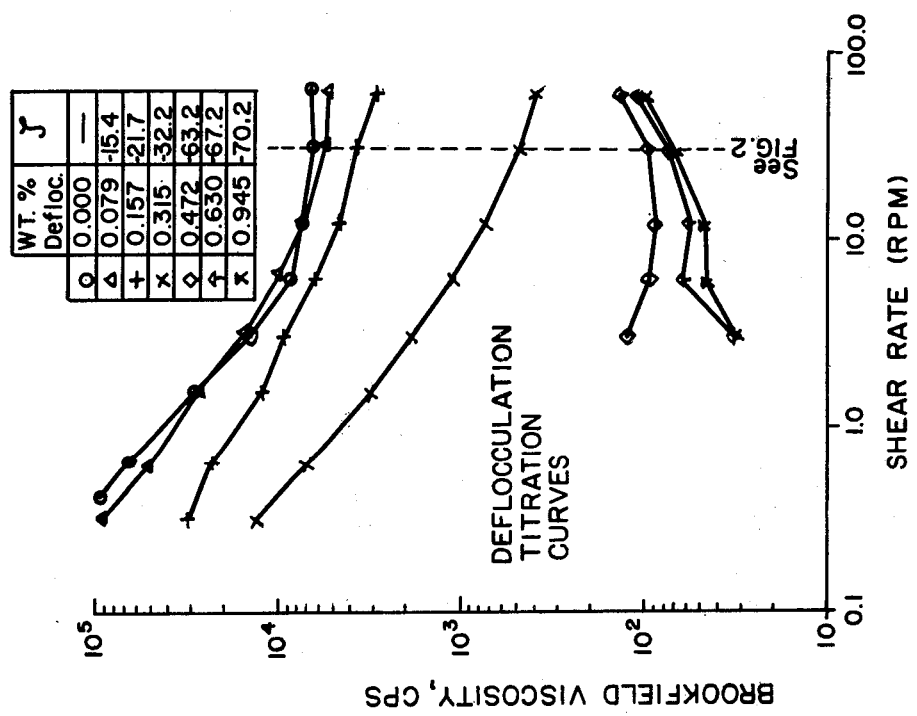
FIG. 13 is a chart illustrating titration curves derived in experimentally selecting electrolyte and/or dispersing agent(s) and determining the optimum wgt. % needed for dispersing coal particles in carrier water by addition of incremental amounts of agent, measuring shear rate in rpm after each addition, and correlating the shear rate in rpm with Brookfield viscosity in centipoises.

(c) Reference may now be made to FIGS. 2 and 13, which summarize the results obtained in screening tests carried out in accordance with (a) and (b) of this example using coal from an Eastern Kentucky mine at 55 wgt. % concentration and an anionic organic surfactant, sodium salt of an alkyl mono naphthalene sulfonic acid (Lomar D), as a defloccuclant dispersing agent.

Referring to FIG. 13, and its inset, it is seen that as the amount of defloccuclant was increased from zero to 0.945 wgt. %, the zeta potential increased gradually with each incremental addition of Lomar D from (−) 15.4 mv at 0.079 wgt. % to (−) 70.2 mv at 0.945%. Simultaneously, as the shear rate (rpm) was increased during the time of presence of each incremental amount, the Brookfield viscosity is seen to decrease until it reaches a minimum value at 30 rpm, while the rheology of the system is seen to change from pseudoplastic to dilatent at a rate between 30 and 60 rpm.

Referring now to FIG. 2, it is seen that the chart line formed from the data from the inset of FIG. 13 forms a distinctive curve. The curve shows that as zeta potential increases from (−) 15.4 to (−) 67.7 mv, the Brookfield viscosity falls from about 7000 cps to about 80 cps, and then levels off at about 75 cps at (−) 70.2 mv. From this data and chart, it is indicated that near maximum zeta potential can be identified as being about (−) 63.2 μm, and the amount of Lomar D to use to make an Alfred formula coal-water slurry will be about 0.5 wgt. % based on the weight of coal, both dry basis. To be on the safer side, the amount of dispersing agent can be decreased slightly, e.g. to about 0.45 wgt. %, or less.

While the above methods have been described using a preferred dispersing agent, Lomar D, it will be clear to one skilled in the art that any material can be similarly screened to find advantageous materials which can be used to practice the invention.

EXAMPLES 2—PREPARATION OF COAL SAMPLES FOR SIZE MEASUREMENTS.

(a) Sieve analysis

Although any standard procedure may be used to measure particle sizes of coal particles from a coal and then to calculate the particle size distribution, the procedure used in obtaining data discussed herein will be described.

A weighed sample, e.g. 50 grams dry wgt. of coal is dispersed in 400 ml of carrier water containing 1.0 wgt. % Lomar D based on a weight of coal, dry basis, and the slurry is mixed for 10 minutes with a Hamilton Beach mixer. The sample is then allowed to stand quiescent for 4 hours, or preferably, overnight. (This step usually is not necessary if the slurry was milled with surfactant).

The sample is then remixed very briefly. It then is poured slowly on a stack of tared U.S. Standard sieves over a large vessel. The sample is carefully washed with running water through the top sieve with the rest of the stack intact until all sievable material on that sieve is washed through the sieve into the underlying sieves. The top sieve is then removed and each sieve in the stack, as it becomes the top sieve, is successively washed and removed until each sieve has been washed. The sieves are then dried in a dryer at 105° C. and the residue on each is weighed in a known way.

The sample which passed through the finest sieve was collected as a dilute slurry in a container for Sedigraph analysis.

(b) Sedigraph analysis

The sample finer than the smallest sieve size is carefully stirred and a representative sample (about 200 ml) is taken for analysis. The rest may be discarded.

About 2 eyedroppers of the dilute slurry is further diluted in 30 ml of distilled water with 4 drops of Lomar D added. This sample is stirred overnight with a magnetic stirrer. Measurement is then made with the Sedigraph 5500L.

The Sedigraph 5500L uses photo extinction to measure particles. It essentially measures projected shadows and due to diffraction effects around particles the data must be converted to mass-wgt.-%-finer-than. The data from the sieve and Sedigraph is combined with the $D_S$ data obtained by SEM and used to prepare a CPFT chart.

EXAMPLE 3—PREPARATION OF BIMODAL BLENDED 75 WGT. % COAL-WATER SLURRY, $D_L = 150 \mu m$

A 75 wgt. % coal-water slurry hereof is prepared using coal from the Black Mesa mine, as follows. A fine (F.G.) grind portion is prepared by adding to a ball mill 30 parts of carrier water, about 22.5 parts of pulverized coal (P.C.) and further adding, as electrolyte and dispersing agents, 0.075 parts of anionic surfactant, preferably Lomar D, and 0.075 parts of NaOH. The mixture is ball milled until the particle size distribution is about 45 wgt. % finer than 3 $\mu m$. Also, about 52.5 parts of dry pulverized coal (P.C.) are milled until the coal has a particle size distribution in accordance with the Alfred consist formula where $D_L$ is 150 $\mu m$ (100 mesh), $D_S$ is <0.7 $\mu m$, and n is 0.8, as defined above, to obtain a pulverized coal (P.C.) fraction which is about 78 wgt. % (−) 79 $\mu m$. A sufficient amount (47.35 parts) of the P.C. fraction is then added to the fine grind coal fraction to form the final 75 wgt. % coal-water slurry having an Alfred formula consist of 150 $\mu m \times 0.2$ $\mu m$ with about 17.5 wgt. % minus 3 $\mu m$. The total amount of electrolyte and dispersing agent(s) used is predetermined by laboratory tests as described herein. It is effective to bring the entire compact of pulverized coal particles to near maximum zeta potential, and also, to maintain the particles in dispersed, or deflocculated, form in the carrier water of the slurry during pipeline pumping storage and pumping to an atomizer of a coal-water slurry burner or to other use means.

The above method can easily be carried out whether using monomodal or multimodal distributions of particle sizes. For a monomodal distribution the electrolyte and dispersing agent preferably are added to the carrier water before it enters the pulverizing mill with the coal. The coal is then ground in the presence of these agents. For multimodal distributions the deflocculant dispersing agent preferably is added in water as described above, while grinding the fine fraction, and no dispersing agent needs to be added to the coarse pulverized (P.C.) fractions. The coarse dry P.C. fraction can then be added to the deflocculated F.G. fraction, as described above.

If a coal cleaning process including use of a filter press to recover solids is incorporated in the process, coarse P.C. grind having a coarse fraction consist suitable for preparing Alfred formula compact is first cleaned, then flocculated using appropriate flocculating chemicals prior to filter pressing and dewatering the coal, which removes these chemicals. An appropriate percentage of P.C. filter cake is then fine ground in the presence of all the defloculant added as required to prepare the F.G. fraction. The resulting fine ground deflocculated slurry is then blended with an appropriate percentage of the P.C. filter cake in a fine blunger or mixing tank to obtain Alfred formula coal-water slurry ready for pipeline pumping or storage or for burning or otherwise using the coal-water slurry.

EXAMPLE 4—INTEGRATED PROCESS WITH DEASHING AND BLENDING $D_L = 300 \mu m$.

The practice of the invention in an integrated process for plant scale operation with de-ashing of West Virginia coal will now be described with reference to FIGS. 6 and 7 of the drawing.

Figure 11:
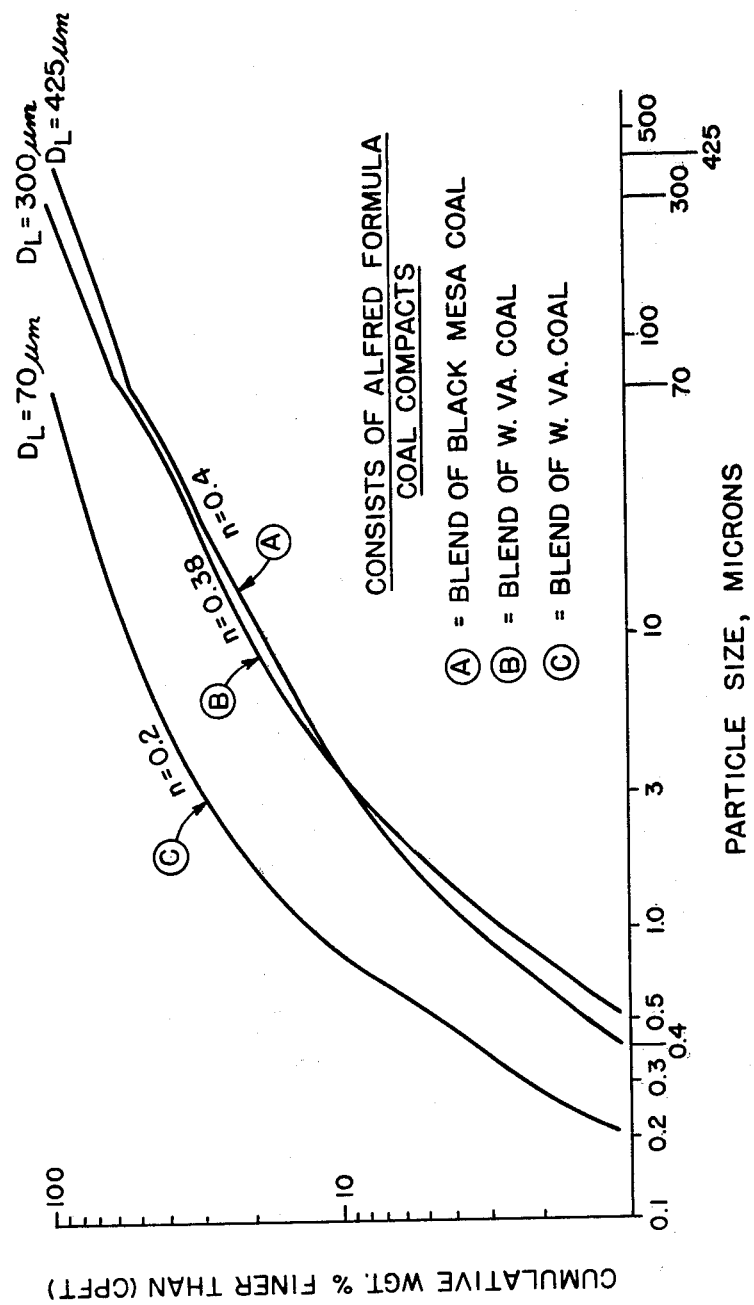
FIG. 11 is a chart showing correlations between consists by wgt. % and particle sizes in microns of coal compacts made according to the Alfred consist formula from blends of coarse and fine fractions of Black Mesa coal and of West Virginia coal, respectively, with $D_L$ as shown and with $D_S < 3$ $\mu$m.

Bituminous coal from West Virginia, containing about 21% ash as mined or washed is introduced into a crusher 1 wherein it is crushed to about 2" size or less. The term "Ash" is used herein to define non-combustible content of the coal, such as clay and various minerals. The crushed coal is charged into a mill 2, preferably a ball mill, where it is wet milled to a particle size of about 70%(−)200 mesh ((−)75 $\mu m$) with about 7% (−) 3 $\mu m$ to provide a coarse fraction of coal particles suitable for preparing a coal compact in accordance with the Alfred consist formula with $D_L = 300$ $\mu m$, $D_S = <1.0$ $\mu m$ and n=0.5, substantially as shown in FIG. 11, when mixed with the fine grind portion made as described later herein.

The particles of coarse milled coal are then charged to a slurry tank 3 containing carrier water in an amount sufficient to maintain a solids content of about 10% by weight. The pH of the mass in tank 3 is maintained at a pH of 10 or higher by addition of a solution of NaOH to cause deflocculation and separation of ash materials. Tank 3 is provided with a high intensity agitator 4 to effect dispersion of all particles. After about 20 minutes agitation, the slurry is continuously pumped by pump 3a through line 7 through the hydrocyclone 5 and hence back to tank 3. The hydrocyclone 5 removes the higher specific gravity minerals, preferably flocculated, and delivers them to scrap or reprocessing. After a suitable time of cycling the slurry through the hydrocyclone to maximize ash removal, the valve 3B is closed and valve 3C opened to filter press 6 to filter the batch from tank 3. Filtrate from filter press 6 is recycled to tank 3. The pH of the water is adjusted by addition of a solution of caustic soda (NaOH). The partially ash-free coal thus obtained contains from about 0.5 to 10 wgt. % of ash. Treatment of the coal in tank 3 is, however, beneficial to remove at least gross amounts of the ash content of the coal, thereby increasing the net btu value of the coal-water slurry.

A minor fraction of the filter cake from filter 6 containing filtered coal and about 25 wgt. % water is discharged to a second slurry tank 8 where the cake may be diluted with water from line 8a, if water is needed and is agitated by means of a low speed agitator 9a operated as in tank 3. The filter cake is dispersed in tank 8 with sufficient water present to later make a final coal-water slurry of about 75 wgt. % solids after adding a first predetermined amount of deflocculant, further milling this minor fraction of coal to a fine grind and blending it with a major fraction of filtered coal from filter press 6 in a third slurry tank 14. The coal-water slurry from tank 8 is discharged through line 15 into line 16 from which it is fed into lines 17 and 18 leading to ball mills 19 and 20. A final predetermined amount of a solution of mixed deflocculants, usually making a total amount providing about 0.7 wgt. % of Lomar D and 0.7 wgt. % of NaOH and usually sufficient to adjust the zeta potential of the particles to near maximum zeta potential and to disperse the particles, based on the total amount of dry coal in the final coat-water slurry to be made in tank 14, is added to the coal-water slurries in ball mills 19 and 20. The ball mills preferably are steel and are loaded with steel balls. The coal is milled to a fine grind about 95 wgt. % (−) 40 μm×about 10 wgt. % (−) 3 μm. The milled, fine grind coal is discharged from ball mills 19 and 20 through lines 24 and 25 into tank 14 where it is blended and agitated by means of agitator 9 with the major fraction of de-ashed coal from filter press 6. The coarse and fine grind coals are blended in proportions such that the blend has 75 wgt. % of coal, dry basis, and the coal particles have a substantially non-undulating Alfred formula coal consist having about 10 wgt. % of coal particles (−) 3 μm and the particles have a particle size range of about 300 μm×0.1 μm. The resulting final coal-water slurry product is a pipeline pumpable 75 wgt. % low viscosity Alfred formula coal-water slurry usually having a Brookfield viscosity of about 1000 to 2000 cps at 60 rpms.

The deflocculated yield pseudoplastic coal-water slurry is discharged from tank 14 to a storage tank 10. Successive charges of the slurry are blended continuously in tank 10, preferably by pumping it continuously through a recycle pipeline 11 leading from the bottom of tank 10 to the top of tank 10. Uniformity of the slurry is thus maintained and provides slurry of a substantially uniform btu content. The blended Alfred formula coal-water slurry is pumped from storage tank 10 through pipeline 27, which may be a short pipeline or a long distance pipeline, and is fed into an atomizer burner 12 of a furnace 13 used to generate heat energy to heat water in a steam boiler. Details of a typical atomizer burner for burning a coal-water-anionic organic surfactant are shown in FIG. 7.

Aqueous treatment of the coal for ash removal, deflocculation, and concentration also provides a suitable vehicle for sulfur removal. The amount of deflocculant or of a mixture of deflocculants, such as the anionic organic surfactant and NaOH, which must be used to obtain the benefits and advantages of the invention using the Alfred formula consist can be readily predetermined in accordance with the procedures described in Examples 1-3.

EXAMPLE 5 OF INTEGRATED PROCESS, WITH BLENDING BUT WITHOUT DEASHING, $D_L = 425$ μm

Practice of the invention in an integrated process without deashing for plant scale operation with Black Mesa, Ariz., coal will now be described with further reference to FIGS. 6 and 7 of the drawing.

Sub-bituminous coal from Black Mesa coal fields containing an average ash content of 9.8 wgt. % (range of 6.5% to 17%) as mined or washed is introduced into crusher 1 and crushed to 2" size or less. The crushed coal is milled in about 10 wgt. % of carrier water to prepare pulverized coal (P.C.) particles 50 to 70 wgt. % substantially all finer than 425 μm and suitable for preparing a coal consist in accordance with the Alfred formula with $D_L = 425$ μm, $D_S = <1.0$, and n=about 0.45, substantially as shown in FIG. 11, when mixed with the fine milled portion made as described later herein. The P.C. coal is discharged from mill 2 through line 16. Because of the low ash content of Black Mesa coal, it usually will not be necessary or desirable to de-ash the coal.

Figure 1:
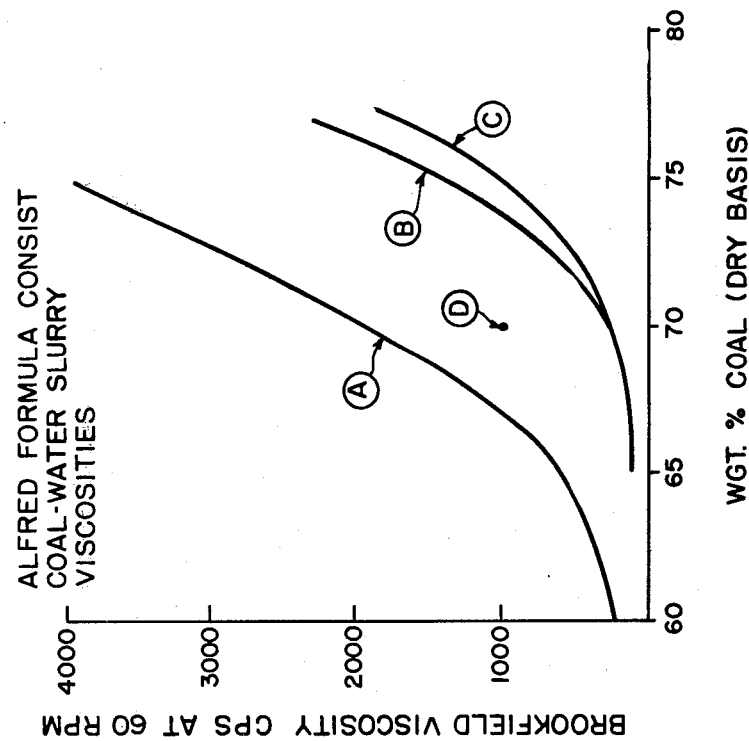
FIG. 1 is a chart showing correlations between Brookfield viscosities in centipoises (cps) at 60 rpm and wgt. % of coal, dry basis, content of several Alfred formula consist coal-water slurries.

A minor fraction of the Milled (P.C.) coal from line 16 is fed through lines 17 and 18 into ball mills 19 and 20. A solution of part of a predetermined amount of defloculant materials is added to ball mills 19 and 20 and additional carrier water is added to each mill, for example, from line 8a, through tank 8, line 15 and lines 17 and 18, respectively. The amount of water added will depend on the amount of water present in the pulverized coal from ball mill 2. A major fraction of pulverized coal is fed through lines 16, 17, 18, 25 and 26 to tank 14. The total amount of minor and major fractions of pulverized coal will amount to a final amount of coal which when diluted with the water added to ball mills 19 and 20 will make up to a 75 wgt. % coal-water slurry and can readily be calculated. The rest of the predetermined amount of deflocculants needed to provide the colloidal particles of coal in the coal-water slurry with near maximum zeta potential is added to the ball mills 19 and 20 to provide a mixture of 1.0 wgt. % of Strodex V8 and 1.0 wgt. % NaOH, based on the total weight of dry coal in the final coal-water slurry to be made up in tank 14. The necessary amount of water needed in mills 19 and 20 is added also. The mills are run for about 30 hours at 60 rpm or until a fine grind of Black Mesa coal is obtained which is 99 wgt. % minus 10 μm and about 46 wgt. % minus 3 μm. The milled, fine grind coal-water slurry is then discharged into tank 14 where it is blended with the major fraction of pulverized coal in proportions such that the blend has 75 wgt. % of coal, dry basis, and the coal particles have a substantially non-undulating coal consist in accordance with the Alfred formula as defined above with n=about 0.45 and particle size of about 7 wgt. % of coal particles minus 3 μm. The resulting Alfred formula coal-water slurry usually will have a Brookfield viscosity of about 4000 cps at 60 rpm, substantially as shown in FIG. 1, A.

The deflocculated, yield pseudoplastic 75 wgt. % coal-water slurry is discharged into tank 10, where it is blended as described in Example 4, and pumped to a use site in short or long distance pipelines for burning in an atomizer burner furnace as described in Example 4.

EXAMPLE 6—INTEGRATED PROCESS, WITH OR WITHOUT DEASHING WITH BLENDING, $D_L = 75$ μm

Using substantially the same method as described in Examples 4 and 5, West Virginia or Eastern Kentucky coal, can be milled and dispersed in carrier water to prepare pipeline pumpable Alfred formula coal-water slurry with from about 65 to 77 wgt. % coal, with $D_L = 75$ μm, $D_S = <1.0$ μm, and $n = 0.2$ to 0.8 with about 6.6 to 29.3 wgt. % of particles of $(-)$ 3 μm. The slurry will usually have a Brookfield viscosity at 60 rpm of from 300 to 2400 cps.

EXAMPLE 7—INTEGRATED PROCESS, WITHOUT BLENDING, $D_L = 300$ μm

In view of the finding that West Virginia coal can be milled directly to prepare an Alfred formula coal compact, this coal usually can be milled and used to make coal-water slurry without need to make a blend from a coarse fraction and a fine fraction as was done in Examples 4—6.

Referring to FIG. 6, 75 wgt. % Alfred formula coal-water slurry having an Alfred formula consist with $D_L = 300$, $D_S = <1.0$ and $n = 0.2$ to 0.6, substantially as shown in FIG. 12, can be made as follows:

Crushed coal is charged into mill 2 and wet milled to a particle size of about 50 wgt. % $(-)$ 200 mesh $((-) 75$ μm). The coarse grind is discharged through line 16 into ball mill 19 or 20, alternately or simultaneously, as desired. Predetermined total amounts of electrolyte and/or dispersing agent(s), e.g. 1.0 wgt. % of Lomar D and 1.0 wgt. % of NaOH, are added to each of mill 19 and/or 20 as needed from deflocculant tank 21. The coal is then milled in mills 19 and/or 20 until a sample shows that the $D_L$, $D_S$ and n values recited above have been attained and that there are at least 5 wgt. % of particles of $(-)$ 3 μm present. Usually the amount of $(-)$ 3 μm particles will be from about 20.5 wgt. % at $n = 0.2$ to about 5.0 wgt. % at $n = 0.6$. The coal-water slurry is tested to confirm that the zeta potential is near maximum zeta potential (e.g. about $(-)$ 50 mv as shown in FIG. 2), and that the Brookfield viscosity is about 1000-1500 cps. The slurry is then discharged into tank 14 for blending of batches. The slurry can be stored in tank 10 and charged from there into the atomizer burner 12 for burning.

EXAMPLE 8—INTEGRATED PROCESS, WITHOUT BLENDING, WITH DEASHING, $D_L = 300$ μm

If the West Virginia coal is to be used in a deashed form, the above process can be modified by discharging the 50 wgt. % $(-)$ 200 mesh coal from mill 2 into tank 3 for deashing substantially as described in connection with Example 4. The deashed filter cake from filter press 6 can then be charged to tank 8 for dilution with carrier water and transferred to mills 19 and/or 20 as discussed above for further milling and deflocculation to form the Alfred formula coal-water slurry having the properties as described above.

EXAMPLE 9—INTEGRATED PROCESS—DIRECT MILLING WITHOUT DEASHING, $D_L = 1180$ μm

In a variation of Example 8, crushed coal could be directly charged into ball mill 19 and 20 by means of charge lines (not shown) leading from the crusher to the ball mills. The electrolyte and/or dispersing agent then can be added directly into ball mills 19 and 20 in the predetermined total amounts with additional carrier water as described in Example 8 and milling carried out to obtain Alfred formula coal-water slurry with $D_L = 1180$ μm. The finished slurry can then be further handled, as described above, in tanks 14 and 10 and burner 12.

Net heat content of the Alfred formula 75 wgt. % coal-water slurries of the above compositions made according to the processes of Examples 1-9 are calculated to be about 105,000 btu/gallon of slurry when burned in the atomizer of a gas supported burner, compared to fuel oil which provides about 130,000 btu/gallon.

The flame produced by the burning of the coal slurry can be radiation stabilized, although it may be possible for self-stabilization to occur at about 75% solids content in a properly designed burner.

Cost calculations which have been made show that Alfred coal-water slurry of the invention can be produced in large quantities to make the slurry competitive with oil on an equivalent heating value basis.

Although the invention has been described in relation to use of the Alfred formula coal-water slurry for heat generation by direct combustion, it is also intended that the slurry of the invention be used in coal gasification or liquifaction processes to provide fuel gases and other coal byproducts. Besides being useful in conventional heat generating systems, this coal-water slurry may provide unique properties for use in MHD generators (magneto-hydro-dynamic) in as much as the slurry can be prepared to contain alkali ions needed in the combustion process in such generators.

Furthermore, the Alfred formula can be used in preparing Alfred formula compacts of other solid materials which can be milled or otherwise provided in a particle size for preparing a solids compact characterized in that it comprises finely-divided solid particles of at least one solid material having a particle size in the range of about 1180 μm to 0.05 μm with at least 5 wgt. % of the particles being of colloidal size, e.g. $(-)$ 3μm, and having a particle size distribution in accordance with the Alfred consist formula. The solid material can be any natural or synthetic material. Preferably it will be a mineral, or other similar natural material. Most preferably, the solid material will be an ore, for example, iron ore, or a precious metal ore, such as chromium, nickel, silver or gold ore.

The Alfred formula compact of finely-divided solid material having an Alfred formula consist can be mixed with a fluid, which can be water, or a polar solvent, e.g. a ketone or an alcohol, or a hydrocarbon, e.g. fuel oil or naphtha, or a gas, for example, nitrogen or inert combustion gases, to make a solids-fluid slurry. The amount of fluid used usually will be in an amount at least sufficient to transport the slurry in a pipeline, as is done with the coal-water slurry of the invention.

When the solids-fluid slurry contains water, and the solid material is not water soluble, electrolyte and/or a dispersing agent can be used to disperse the solids in the fluid substantially in the way used to obtain the coal-water slurry having zeta potential at near maximum zeta potential.

It is to be understood that the foregoing description and Examples are illustrative only and that changes can be made in the ingredients and their proportions and in the sequence and combinations of process steps as well as other aspects of the invention discussed without departing from the scope of the invention as defined in the following claims.

What is claimed is:

1. A coal compact comprising finely divided coal particles, characterized in that said coal compact comprises finely divided coal particles having a particle size in the range of 1180 μm to 0.05 μm with at least 5 wgt. % of the particles being of colloidal size, said particles in said compact having a particle size distribution substantially in accordance with the following formula:

$$CPFT = \left[\frac{D_\mu{}^n - D_S{}^n}{D_L{}^n - D_S{}^n}\right] \cdot 100, \text{ where}$$

$CPFT$ = cumulative weight percent, dry basis, of particles finer than a particle $\mu$ of stated size,
$D_\mu$ = diameter of particle $\mu$,
$D_L$ = diameter of largest particle in compact, sieve size or its equivalent, being from 38 to 1180 μm,
$D_S$ = diameter of smallest particle in compact, SEM size or its equivalent, being from 0.05 to 3 μm,
$n$ = numerical exponent, with $n$ being in the range of 0.2 to 0.7, and with all diameters sized in μm wherein, when said compact is admixed with dispersing agent and a sufficient amount of water to produce a suspension containing at least about 60 weight percent of said coal and at least about 20 weight percent of said water, said suspension has a Brookfield viscosity at 60 revolutions per minute of less than 4000 centipoise.

2. A coal compact according to claim 1 characterized in that said colloidal particles are of (−) 3 μm size and said compact contains from about 5.0 to about 35.7 cumulative weight percent of particles finer than 3 μm.

3. A coal compact according to claim 1 characterized in that said $D_L$, $D_S$, n and the wgt. % of particles of (−) 3 μm size are in accordance with said formula wherein:
 (a) $D_L$=about 425 μm, $D_S$=0.1 to 1.0 μm, n=0.2 to 0.5, (−) 3 μm sized particles are from 17.7 to 5.8 wgt. %, respectively,
 (b) $D_L$=about 300 μm, $D_S$=0.05 to 0.5, n=0.2 to 0.635, (−) 3 μm sized particles are from 20.5 to 5.0 wgt. %, respectively,
 (c) $D_L$=about 1180 μm, $D_S$=0.1 to 1.0, n=0.12 to 0.4, (−) 3 μm sized particles are from 19.5 to 5.7 wgt. %, respectively, and
 (d) $D_L$=about 38 μm, $D_S$=0.1 to 1.0, n=0.22 to 1.0, (−) 3 μm sized particles are from 35.7 to 7.0 wgt. %, respectively,
said wgt. % being based on total weight of coal in said compact, dry basis.

4. A stable, yield-pseudoplastic coal-water slurry with a Brookfield viscosity at 60 revolutions per minute of less than 4000 centipoise; said slurry containing at least about 60 weight percent of coal, at least about 20 weight percent of water, and dispersing agent; said slurry comprising a compact of finely-divided particles of coal dispersed in said water characterized in that said compact comprises finely-divided coal particles having a particle size in the range of 1180 μm to 0.05 μm with at least 5 wgt. % of the particles being of colloidal size, said particles in said compact having a particle size distribution substantially in accordance with the following formula:

$$CPFT = \left[\frac{D_\mu{}^n - D_S{}^n}{D_L{}^n - D_S{}^n}\right] \cdot 100, \text{ where}$$

$CPFT$ = cumulative weight percent, dry basis, of particles finer than a particle $\mu$ of stated size,
$D_\mu$ = diameter of particle $\mu$,
$D_L$ = diameter of largest particle in compact, sieve size or its equivalent, and being from about 38 to about 1180 microns;
$D_S$ = diameter or smallest particle in compact, SEM size or its equivalent, and being from about 0.5 to about 3 microns;
$n$ = numerical exponent, with $n$ being in the range of 0.2 to 0.7 and with all diameters sized in μm;

and said coal particles having near maximum zeta potential in said coal-water slurry.

5. A coal-water slurry according to claim 4 characterized in that said slurry contains from 60 to 75 wgt. % of coal, dry basis, said coal is Black Mesa mine coal, and said slurry has a Brookfield viscosity at 60 rpm of from about 300 to about 4000 cps, respectively.

6. A coal-water slurry according to claim 4 characterized in that said slurry contains from 65 to 80 wgt. % of coal, dry basis, said coal is West Virginia mine coal, and said slurry has a Brookfield viscosity at 60 rpm of about 200 to about 2400 cps.

7. A coal-water slurry according to claim 4 characterized in that said colloidal particles are of (−) 3 μm size and said compact contains from about 5.0 to about 35.7 cumulative weight percent of particles finer than 3 microns.

8. A coal-water slurry according to claim 4 characterized in that said $D_L$, $D_S$, n and the wgt. % of (−) 3 μm size particles are in accordance with said formula wherein:
 (a) $D_L$=about 425 μm, $D_S$=0.1 to 1.0 μm, n=0.2 to 0.5, (−) 3 μm sized particles are from 17.7 to 5.8 wgt. %, respectively,
 (b) $D_L$=about 300 μm, $D_S$=0.05 to 0.5, n=0.2 to 0.635, (−) 3 μm sized particles are from 20.5 to 5.0 wgt. %, respectively,
 (c) $D_L$=about 1180 μm, $D_S$=0.1 to 1.0, n=0.12 to 0.4, (−) 3 μm sized particles are from 19.5 to 5.7 wgt. %, respectively, and
 (d) $D_L$=about 38 μm, $D_S$=0.1 to 1.0, n=0.22 to 1.0, (−) 3 μm sized particles are from 35.7 to 7.0 wgt. %, respectively,
said wgt. % being based on total weight of coal in said compact, dry basis.

9. A coal-water slurry according to claim 4 characterized in that $D_L$=about 300 μm, $D_S$=<1.0 μm, n=0.2 to 0.635 and (−) 3 μm size particles=20.5 to 5.0 wgt. %, respectively, of the total weight of coal, dry basis.

10. A coal-water slurry according to claim 4 characterized in that $D_L$=about 300 μm, $D_S$=<0.5 μm, n=about 0.4, and (−) 3 μm sized particles=about 9 wgt. % based on total weight of coal, dry basis.

11. A coal-water slurry according to claim 4 characterized in that said dispersing agent is present in an amount sufficient to disperse said coal particles and to maintain the dispersed coal particles at said near maximum zeta potential.

12. A coal-water slurry according to claim 11 characterized in that said amount of dispersing agent is from 0.05 to 2 wgt. % based on dry weight of coal.

13. A coal-water slurry according to claim 12 wherein said dispersing agent is an organic or inorganic surfactant and characterized in that said surfactant is an anionic surfactant.

14. A coal-water slurry according to claim 13 characterized in that the anionic surfactant is selected from the group of anionic surfactants consisting of:
   (i) 2-ethylhexyl polyphosphoric ester acid anhydride and its potassium salt,
   (ii) complex organic polyphosporic ester acid anhydride and its potassium salt,
   (iii) alkyl mononaphthalene sulfonic acid and its sodium and ammonium salts, and
   (iv) mixtures thereof.

15. A coal-water slurry according to claim 14 characterized in that the anionic surfactant is a sodium salt of an alkyl mononaphthalene sulfonic acid.

16. A coal-water slurry according to claim 4 further comprising at least one electrolyte and characterized in that said electrolyte is present in an amount effective to modify the structure of the bound water layers of said coal particles and help to maintain said particles at said near maximum zeta potential.

17. A coal-water slurry according to claim 16 characterized in that said amount of electrolyte is up to about 2 wgt. % based on dry weight of coal.

18. A coal-water slurry according to claim 17 characterized in that said electrolyte is a compound selected from the group of inorganic compounds consisting of NaOH, $K_2CO_3$, and $Na_2SiO_3 \cdot 9H_2O$.

19. A coal-water slurry according to claim 18 characterized in that said electrolyte is NaOH.

20. A coal-water slurry according to claim 16 characterized in that said dispersing agent and said electrolyte are present in a total amount sufficient to disperse said coal particles and to maintain the dispersed coal particles at said near maximum zeta potential.

21. A coal-water slurry according to claim 20 characterized in that said dispersing agent is an organic surfactant selected from the group of anionic surfactants consisting of:
   (i) 2-ethylhexyl polyphosphoric ester acid anhydride and its potassium salt,
   (ii) complex organic polyphosphoric ester acid anhydride and its potassium salt,
   (iii) alkyl mononaphthalene sulfonic acid and its sodium and ammonium salts, and
   (iv) mixtures thereof,
and said electrolyte is an inorganic compound selected from the group of inorganic compounds consisting of NaOH, $K_2CO_3$, and $Na_2SiO_3 \cdot 9H_2O$.

22. A coal-water slurry according to claim 21 characterized in that said dispersing agent is a sodium salt of an alkyl mononaphthalene sulfonic acid and said electrolyte is NaOH.

23. A coal-water slurry according to claim 4 characterized in that said near maximum zeta potential is less than about (−) 100 millivolts.

24. A coal-water slurry according to claim 4 characterized in that near maximum zeta potential is about (−) 50 to (−) 60 millivolts.

25. A method for preparing a coal-fluid suspension with a Brookfield viscosity at 60 revolutions per minute of less than 4000 centipoise, comprising the steps of:
   (a) providing the coal compact of claim 1, and
   (b) mixing said compact with dispersing agent and a sufficient amount of fluid to produce a suspension containing at least about 60 weight percent of said coal and at least about 20 weight percent of said fluid.

26. The method as recited in claim 25, wherein said fluid is water.

27. The method as recited in claim 26, wherein a sufficient amount of said dispersing agent is mixed with said compact to disperse said coal particles and to maintain the dispersed coal particles at near maximum zeta potential in said coal-water slurry.

28. The method as recited in claim 26, wherein up to about 4 percent of dispersing agent, by weight of dry coal, is mixed with said compact.

29. The method as recited in claim 28, wherein said suspension has a Brookfield viscosity at 60 revolutions per minute of from about 300 to about 4000 centipoise.

30. The method as recited in claim 28, wherein said suspension has a Brookfield viscosity at 60 revolutions per minute of from about 200 to about 2400 centipoise.

31. The method as recited in claim 28, wherein said $D_L$, $D_S$, n, and the weight percent of (−) 3 μm size particles are in accordance with said formula, wherein:
   (a) $D_L$=about 425 μm, $D_S$=0.1 to 1.0 μm, n=0.2 to 0.5, (−) 3 μm sized particles are from 17.7 to 5.8 wgt. %, respectively,
   (b) $D_L$=about 300 μm, $D_S$=0.05 to 0.5 μm, n=0.2 to 0.635, (−) 3 μm sized particles are from 20.5 to 5.0 wgt. %, respectively,
   (c) $D_L$=about 1180 μm, $D_S$=0.1 to 1.0 μm, n=0.12 to 0.4, (−) 3 μm sized particles are from 19.5 to 5.7 wgt. %, respectively, and
   (d) $D_L$=about 38 μm, $D_S$=0.1 to 1.0, μm, n=0.22 to 1.0, (−) 3 μm sized particles are from 35.7 to 7.0 wgt. %, respectively,
said wgt. % being based on total weight of coal in said compact, dry basis.

32. The method as recited in claim 28 wherein $D_L$=about 300 μm, $D_S$=1.0 μm, n=0.2 to 0.635, and (−) 3 μm size particles=20.5 to 5.0 wgt. % respectively, of the total weight of coal, dry basis.

33. The method as recited in claim 28, wherein $D_L$=about 300 μm, $D_S$=0.5 μm, n=about 0.4, and (−) 3 μm sized particles=about 9 wgt. % based on total weight of coal, dry basis.

34. The method as recited in claim 28, wherein from about 0.05 to about 2.0 percent of said dispersing agent, by weight of dry coal, is mixed with said compact.

35. The method as recited in claim 34, wherein said dispersing agent is an anionic surfactant.

36. The method as recited in claim 35, wherein said anionic surfactant is selected from the group consisting of:
   (i) 2-ethylhexyl polyphosphoric ester acid anhydride and its potassium salt,
   (ii) complex organic polyphosphoric ester acid anhydride and its potassium salt,
   (iii) alkyl mononaphthalene sulfonic acid and its sodium and ammonium salts, and
   (iv) mixtures thereof.

37. The method as recited in claim 36, wherein said anionic surfactant is a sodium salt of an alkyl mononaphthalene sulfonic acid.

38. The method as recited in claim 28, wherein up to about 2 percent, by weight of dry coal, of electrolyte is mixed with said compact.

39. The method as recited in claim 38, wherein said electrolyte is an inorganic compound.

40. The method as recited in claim 39, wherein said electrolyte is selected from the group consisting of NaOH, $K_2CO_3$, and $Na_2SiO_3 \cdot 9H_2O$.

* * * * *